United States Patent
Muraguchi et al.

(10) Patent No.: US 10,239,759 B2
(45) Date of Patent: *Mar. 26, 2019

(54) METHOD OF PRODUCING SILICA-BASED PARTICLES

(71) Applicant: JGC CATALYSTS AND CHEMICALS LTD., Kawasaki-shi, Kanagawa (JP)

(72) Inventors: Ryo Muraguchi, Kitakyushu (JP); Mitsuaki Kumazawa, Kitakyushu (JP); Toshiharu Hirai, Kitakyushu (JP)

(73) Assignee: JGC CATALYSTS AND CHEMICALS LTD., Kawasaki-Shi, Kanagawa (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/607,394

(22) Filed: Jan. 28, 2015

(65) Prior Publication Data

US 2015/0147469 A1     May 28, 2015

Related U.S. Application Data

(62) Division of application No. 11/632,900, filed as application No. PCT/JP2005/013228 on Jul. 19, 2005, now abandoned.

(30) Foreign Application Priority Data

Jul. 21, 2004    (JP) .................................. 2004-213053

(51) Int. Cl.
| | | |
|---|---|---|
| C08K 3/36 | (2006.01) | |
| C08K 7/26 | (2006.01) | |
| C01B 33/18 | (2006.01) | |
| C01B 33/193 | (2006.01) | |
| C09C 1/30 | (2006.01) | |
| C09D 7/40 | (2018.01) | |
| C09D 7/61 | (2018.01) | |

(52) U.S. Cl.
CPC ............ *C01B 33/193* (2013.01); *C01B 33/18* (2013.01); *C08K 3/36* (2013.01); *C09C 1/30* (2013.01); *C09D 7/61* (2018.01); *C09D 7/67* (2018.01); *C09D 7/68* (2018.01); *C08K 7/26* (2013.01); *Y10T 428/2995* (2015.01); *Y10T 428/31935* (2015.04)

(58) Field of Classification Search
CPC ....... C01B 33/193; C01B 33/26; C01B 33/18; C01B 33/146; C01B 13/363; C09C 1/28; C09C 1/3081; C09C 1/30; C09C 1/309; C09C 1/3045; C09D 201/10; C09D 7/12; C09D 7/68; C09D 7/67; C09D 7/61; C09D 7/70; C08K 3/36; C08K 7/26; C08K 9/06; C01P 2004/64; C01P 2004/62; C01P 2004/34; Y10T 428/26; Y10T 428/2984; Y10T 428/31935; Y10T 428/2995

USPC ............................................. 428/402; 516/79
See application file for complete search history.

(56) References Cited

U.S. PATENT DOCUMENTS

| | | | | |
|---|---|---|---|---|
| 2,601,352 A | * | 6/1952 | Wolter ................ | C01B 33/1485 106/38.3 |
| 5,880,201 A | * | 3/1999 | Enomoto ................. | C08K 3/34 524/492 |
| 5,935,700 A | * | 8/1999 | Enomoto ................. | B29D 7/01 428/328 |
| 6,680,040 B1 | * | 1/2004 | Nishida ................ | C03C 17/007 423/335 |
| 6,913,825 B2 | * | 7/2005 | Ostafin ................ | B22F 1/0018 427/212 |
| 2006/0057355 A1 | * | 3/2006 | Suzuki ................... | B82Y 30/00 428/308.4 |

(Continued)

FOREIGN PATENT DOCUMENTS

| | | | |
|---|---|---|---|
| JP | 04-50112 A | * | 2/1992 |
| JP | H06-330606 | * | 11/1994 |

(Continued)

OTHER PUBLICATIONS

Machine Translation of Publ. No. JP 2002-144715 A, published May 2002, Japan patent Office, Tokyo, Japan (Downloaded Sep. 29, 2009), obtained online @ http://www19.ipdl.inpit.go.jp/PA1/cgi-bin/PA1 INDEX.*
Derwent Abstract on East, week 200601, London: Derwent Publications Ltd., AN 1993-208734, Class E37, JP 05132309 A, (Shokubai Kasei Kogyo KK), abstract.*
Derwent Abstract on East, week 200278, London: Derwent Publications Ltd., AN 1995-085149, Class E37, JP 07010522 A, (Shokubai Kasei Kogyo KK), abstract.*
Derwent Abstract on East, week 200622, London: Derwent Publications Ltd., AN 1995-220669, Class E37, JP 07133105 A, (Shokubai Kasei Kogyo KK), abstract.26013522601352.*

(Continued)

*Primary Examiner* — Daniel S Metzmaier
(74) *Attorney, Agent, or Firm* — Manabu Kanesaka

(57) ABSTRACT

A method of producing silica-based particles includes, when a dispersion liquid of composite oxide particles is prepared by simultaneously adding an aqueous silicate solution and/or an acidic silicic acid solution and an aqueous solution of an alkali-soluble inorganic compound in an alkali aqueous solution or in an alkali aqueous solution with seed particles dispersed therein, if required, the aqueous silicate solution and/or the acidic silicic acid solution and the aqueous solution of alkali-soluble inorganic compound are added so that the molar ratio of $MO_x/SiO_2$ are in a range from 0.01 to 2, herein $MO_x$ denoting an inorganic oxide other than silica and $SiO_2$ denoting silica to prepare the dispersion liquid of composite oxide particles with an average diameter ($D_{p1}$) in a range from 3 to 300 nm.

14 Claims, No Drawings

(56) References Cited

U.S. PATENT DOCUMENTS

| | | | | |
|---|---|---|---|---|
| 2008/0090070 A1* | 4/2008 | Muraguchi | ............ | B82Y 30/00 428/332 |
| 2015/0147469 A1* | 5/2015 | Muraguchi | ............. | C01B 33/18 427/220 |

FOREIGN PATENT DOCUMENTS

| | | | | |
|---|---|---|---|---|
| JP | 07-010522 | A | * | 1/1995 |
| JP | H07-013137 | | * | 1/1995 |
| JP | H07-133105 | | * | 5/1995 |
| JP | 08-157745 | A | * | 6/1996 |
| JP | 10-454403 | A | * | 2/1998 |
| JP | H11-029318 | | * | 2/1999 |
| JP | 2001-233611 | | * | 8/2001 |
| JP | 2002-144715 | A | * | 5/2002 |
| JP | 2003-026417 | A | * | 1/2003 |
| WO | WO 97/40105 | | * | 10/1997 |
| WO | WO 01/98222 | A1 | * | 12/2001 |

OTHER PUBLICATIONS

Derwent Abstract on East, week 200554, London: Derwent Publications Ltd., AN 1998-189008, Class J01, JP 10045403 A, (Shokubai Kasei Kogyo KK), abstract.*

Derwent Abstract on East, week 200813, London: Derwent Publications Ltd., AN 2002-051199, Class E36, JP 2001233611 A, (Shokubai Kasei Kogyo KK), abstract.*

Derwent Abstract on East, week 199813, London: Derwent Publications Ltd., AN 1992-109096, Class A26, JP 04050112 A, (Shokubai Kasei Kogyo KK), abstract.*

Derwent Abstract on East, week 200367, London: Derwent Publications Ltd., AN 1994-173998, Class L02, JP 06116560 A, (Shokubai Kasei Kogyo KK), abstract.*

Derwent Abstract on East, week 200174, London: Derwent Publications Ltd., AN 1996-339412, Class A35, JP 08157745 A, (Shokubai Kasei Kogyo KK), abstract.*

Machine Translation of Publ. No. JP 10-454403, published Feb. 1998, Japan patent Office, Tokyo, Japan, obtained online @ http://wwwl9.ipdl.inpit.go.jp/PA1/cgi-bin/PA1 INDEX (Downloaded Dec. 31, 2010).*

Machine Translation of Publ. No. JP 08-157745, published Jun. 1996, Japan patent Office, Tokyo, Japan, obtained online @ http://wwwl9.ipdl.inpit.go.jp/PA1/cgi-bin/PA1 INDEX (Downloaded Dec. 31, 2010).*

Machine Translation of Publ. No. JP 07-010522, published Jan. 1995, Japan patent Office, Tokyo, Japan, obtained online @ http://wwwl9.ipdl.inpit.go.jp/PA1/cgi-bin/PA1 INDEX (Downloaded Dec. 31, 2010).*

"Porous", "Pore", "Cavity": Merriam-Webster.com. Merriam-Webster, n.d. Web. Apr. 1, 2014. /www.merriam-webster.com/dictionary/porous>, http://www.merriam-webster.com/dictionary/pore>, http://www.merriam-webster.com/dictionary/cavity>, p. 1 of 1.*

English Language Machine Translation of Publ. No. JP 2003-026417, published Jan. 2003, Japan patent Office, Tokyo, Japan, obtained online @ http://wwwl 9.ipdl.inpit.go.jp/PA1/cgi-bin/PA1 INDEX (Downloaded Mar. 28, 2016), pp. 1-12.*

PTO 08-7234, English Language Translation of JP 2001-233611 A, Published Aug. 2001, USPTO, Wash, DC, USA, Translated by: Schreiber Translations,Inc. (Sep. 2008), pp. 1-61.*

Ralph K. Iler, The Chemistry of Silica, John Wiley & Sons, NY, NY (copyright 1979), pp. 233-234.*

"Porous." Merriam-Webster.com. Merriam-Webster, n.d. Web. Apr. 1, 2014. <http://www.merriamwebster.com/dictionary/porous>, <http://www.merriamwebster.com/dictionary/pore>, <http://www.merriamwebster.com/dictionary/cavity>, p. 1.*

Hartshorn et al.,Nomenclature of Inorganic Chemistry, "2.8 Inorganic oxoacids and related compounds," in CRC Handbook of Chemistry and Physics, 98th Edition (Internet Version 2018), John R. Rumble, ed., CRC Press/Taylor & Francis, Boca Raton, FL. online @ http://hbcponline.com/faces/documents/02_12/02_12_0001.xhtml (Downloaded Sep. 22, 2017).*

* cited by examiner

METHOD OF PRODUCING SILICA-BASED PARTICLES

TECHNICAL FIELD

The present invention relates to a method of producing the silica-based particles.

BACKGROUND TECHNOLOGY

Hollow silica particles having a particle diameter in the range from 0.1 to about 300 μm are known (Refer to, for instance, Patent document 1, and Patent document 2). Also there is known a method of producing hollow particles each having a tight silica shell by depositing active silica from an aqueous solution of an alkali metal silicate on a core made of a material other than silica, and removing the material without breaking the silica shell (Refer to, for instance, Patent document 3).

Furthermore, there is known spherical silica particles with the size at the level of micron having a core shell structure comprising a shell in the out peripheral portion and a hollow central portion. The shell has a concentration gradient tighter toward the outer side and rougher toward the inner side (Refer to, for instance, Patent document 4).

The present applicant already proposed to produce composite oxide particles with the size at the nanometer level and also having a low refractive index by completely covering surfaces of porous inorganic oxide particles with such a material as silica (Refer to Patent Document 5), and furthermore proposed to produce hollow silica-based particles with the size at the nanometer level and also having a low refractive index by forming a silica coating layer on a particle of composite oxide including silica and an inorganic oxide other than silica, then removing the inorganic oxide other than silica, and covering the particles with silica, if necessary (Refer to Patent document 6).

However, with the particles proposed by the applicant, sometimes a sufficiently low refractive index can not be obtained in practical use of the particles in some applications. Furthermore, in the method of producing the particles described in Patent document 6, the process is rather complicated because of for instance, the necessity of forming a silica coating layer prior to removal of the inorganic oxide other than silica, and there are some problems in the reproducibility and productivity.

Furthermore, in the conventional types of particles as described above, dispersibility of particles in the paint for forming a coating film used in production of a coated substrate and stability of the paint are not sufficient, and a coating film obtained by using the paint for forming a coating film is sometimes not uniform in the thickness and not sufficient in the film strength. Furthermore, water adsorption causes white turbidity in the coating film, namely water resistance of the coating film is sometimes insufficient.

Patent document 1: JP 06330606 A
Patent document 2: JP 07013137 A
Patent document 3: JP 2000500113 A
Patent document 4: JP 11029318 A
Patent document 5: JP 07133105 A
Patent document 6: JP 2001233611 A

DISCLOSURE OF THE INVENTION

Problems to be Solved by the Invention

The present invention is based on and an extension of the invention disclosed in Patent document 6, and an object of the present invention is to provide silica-based particles with a low refractive index. More specifically an object of the present invention is to provide hollow and spherical silica-based particles including porous materials or cavities inside an outer shell thereof by growing porous composite oxide particles (primary particles) adjusting a ratio of a quantity of added silica sources versus a quantity of added sources for an inorganic oxide other than silica and then removing the inorganic oxide other than silica and a method of producing the silica-based particles.

Another object of the present invention is to provide a paint for forming a coating film containing the silica-based particles having porous materials and/or cavities inside thereof and a matrix for forming a coating film and excellent in the stability and capability for forming a coating film.

Still another object of the present invention is to provide a coated substrate having a low refractive index and excellent in adhesiveness to resin or the like as well as in the strength, capability of preventing reflection, and waterproof property.

Means for Solving the Problems

The method of producing silica-based particles according to the present invention includes the following steps (a), (b), (c) and (e):

(a) a step in which, when a dispersion liquid of composite oxide particles is prepared by simultaneously adding an aqueous silicate solution and/or an acidic silicic acid solution and an aqueous solution of an alkali-soluble inorganic compound in an alkali aqueous solution or in an alkali aqueous solution with seed particles dispersed therein, if required, the aqueous silicate solution and/or the acidic silicic acid solution and the aqueous solution of alkali-soluble inorganic compound are added so that the molar ratio of $MO_x/SiO_2$ are in a range from 0.01 to 2, herein $MO_x$ denoting an inorganic oxide other than silica and $SiO_2$ denoting silica to prepare the dispersion liquid of composite oxide particles with an average diameter ($D_{p1}$) in a range from 3 to 300 nm, (b) a step in which the aqueous silicate solution and/or the acidic silicic acid solution and the aqueous solution of alkali-soluble inorganic compound are added at the molar ratio $MO_x/SiO_2$ smaller than that employed in the step (a) above to prepare a dispersion liquid of the composite oxide particles with the average diameters ($D_{p2}$) of up to 500 nm, (c) a step in which an acid is added to the dispersion liquid of composite oxide particles and then at least a portion of elements constituting the composite oxide particles other than silicon is removed to prepare a dispersion liquid of silica-based particles, and (e) a step in which cleaning is performed according to the necessity, and the dispersion liquid of silica-based particles is aged at a range from the room temperature to 300° C.

A value of B/A (A: the molar ratio $MO_x/SiO_2$ in step (a), B: the molar ratio $MO_x/SiO_2$ in step (b)) is preferably 0.8 or below.

A ratio ($D_{p1}/D_{p2}$) of the average diameter ($D_{p1}$) of the composite oxide particles versus the average diameter ($D_{p2}$) of the composite oxide particles is preferably in the range from 0.4 to 0.98.

The step (b) and/or the step (c) above are preferably performed in the presence of an electrolytic salt at a molar ratio ($M_E/M_S$) of 10 or below in which $M_E$ denotes a mole number of the electrolytic salt and $M_S$ denotes a mole number of $SiO_2$.

The following step (d) is preferably performed between the step (c) and the step (e).

(d) a step in which an organic silicon compound expressed by the following chemical formula (1) and/or a partially hydrolyzed product thereof, and an alkali aqueous solution, if necessary, are added in the dispersion liquid of silica-based particles obtained in the step (c) above to form a silica-coating layer on the particles:

$$R_nSiX_{(4-n)} \quad (1)$$

wherein R denotes a not-substituted or substituted hydrocarbon group having 1 to 10 carbon atoms, an acrylic group, an epoxy group, a methacrylic group, amino group, or a $CF_3$ group; X denotes an alkoxy group having 1 to 4 carbon atoms, a silanol group, a halogen or hydrogen; and n indicates an integral number in the range from 0 to 3.

Preferably the following step (0 is performed after the step (e).

(f) a step in which an organic silicon compound expressed by the following chemical formula (1) and/or a partially hydrolyzed product thereof, and an alkali aqueous solution, if necessary, are added in the dispersion liquid of silica-based particles obtained in the step (e) above to form a silica-coating layer on the particles:

$$R_nSiX_{(4-n)} \quad (1)$$

wherein R denotes a not-substituted or substituted hydrocarbon group having 1 to 10 carbon atoms, an acrylic group, an epoxy group, a methacrylic group, amino group, or a $CF_3$ group; X denotes an alkoxy group having 1 to 4 carbon atoms, a silanol group, a halogen or hydrogen; and n indicates an integral number in the range from 0 to 3.

pH of the alkali aqueous solution or the alkali aqueous solution with seed particles dispersed therein according to the necessity, is preferably 10 or more.

Preferably the following step (g) is performed after the step (e) or step (f) above.

(g) a step in which cleaning is performed according to the necessity, and hydrothermal processing is performed at a temperature in the range from 50 to 300° C.

Preferably the following step (h) is performed after the step (g) above.

(h) a step in which the organic silicon compound expressed by the following chemical formula (1) and/or a partially hydrolyzed product thereof, and an alkali aqueous solution, if necessary, are added in the dispersion liquid of silica-based particles obtained in the step (g) above to form a silica-coating layer on the particles:

$$R_nSiX_{(4-n)} \quad (1)$$

wherein R denotes a not-substituted or substituted hydrocarbon group having 1 to 10 carbon atoms, an acrylic group, an epoxy group, a methacrylic group, amino group, or a $CF_3$ group; X denotes an alkoxy group having 1 to 4 carbon atoms, a silanol group, a halogen or hydrogen; and n indicates an integral number in the range from 0 to 3.

The hydrothermal processing step is preferably repeated several times.

The inorganic material other than silica is preferably alumina.

The obtained dispersion liquid of silica-based particles is preferably cleaned, dried, and calcinated, if required.

An average diameter of the silica-based particles is preferably in the range from 5 nm to 500 nm.

A content of an alkali metal oxide in the silica-based particles or the dispersion liquid of silica-based particles is preferably 5 ppm or below as expressed by a content of $M_2O$ per silica-based particle (M: alkali metal element).

A content of ammonia and/or ammonium ions in the silica-based particles or the dispersion liquid of silica-based particles is preferably 1500 ppm or below as expressed by a content of $NH_3$.

The silica-based particles according to the present invention have a porous material and/or cavities in an outer shell thereof, and a ratio of a specific surface area ($S_B$) of the particles measured by the BET method versus a specific surface area ($S_C$) expressed by the following expression ($S_B/S_C$) is preferably in the range from 1.1 to 5:

$$S_c(m^2/g)=6000/Dp(nm)*\rho$$

wherein Dp denotes an average diameter of the silica-based particles, and $\rho$ indicates a density (g/ml).

An average diameter of the silica-based particles is preferably in the range from 5 to 500 nm.

A thickness of the outer shell is in the range from 0.5 to 20 nm.

A refractive index of the silica-based particles is in the range from 1.15 to 1.38.

The paint for forming coating film according to the present invention includes the silica-based particles produced by the production method described above or any of the silica-based particles described above, and a matrix for forming a coating film. Furthermore the paint for forming coating film preferably includes oxide-based particles other than the silica-based particles.

In the coated substrate according to the present invention, a coating film containing the silica-based particles produced by the production method described above or any of the silica-based particles described above and a matrix for forming a coating film is formed singly or in combination of other coating film on a surface of the substrate.

Effects of the Invention

With the present invention, when composite oxide particles comprising silica and an inorganic oxide other than silica are prepared, at first a composite oxide having a high content of the inorganic oxide other than silica (primary particles) is prepared, and then a composite oxide having a high content of silica (secondary particles) is prepared, a silica content in a surface layer of the particles is high, and the composite oxide particles can preserve the spherical surface in the following step of removing unnecessary elements and are not broken. Because of the features, silica-based particles having an extremely low refractive index can be prepared through an extremely simple production process. Furthermore the production reproducibility and productivity of the silica-based particles are excellent.

After the steps of removing unnecessary elements and aging, or after the steps of removing unnecessary elements and forming a silica-coating layer or aging according to the necessity, the silica-based particles are obtained by hydrothermal processing at a high temperature. In silica-based particles obtained as described above, contents of alkali metal oxide, ammonia, and the like are lowered, and the paint for forming a coating film with the silica-based particles blended therein is highly stable and provides a coating film having high strength.

Even when the hydrothermal processing is not performed, in the silica-based particles obtained by forming a silica-coating layer after the step of removing unnecessary elements or by forming a silica layer after the steps of removing unnecessary elements and aging, the S/Sc described below is in a range from 1.1 to 5, and preferably in the range from 1.2 to 3, and the silica-based particles described above is well and homogeneously dispersed in the paint for forming a coating film, and the obtained paint is excellent in the stability, and a coating film obtained by using the paint is excellent in the strength and also in the water resistance.

In the paint for forming a coating film according to the present invention, contents of the alkali metal oxide and ammonia in the silica-based particles blended therein are low, so that the paint is excellent in the stability, and therefore the coating film obtained by using the paint is excellent in the strength.

Furthermore, the coated substrate according to the present invention has a low refractive index, and is excellent in such properties as adhesiveness to resin or the like, strength, transparency, and reflection preventing property.

BEST MODE FOR CARRYING OUT THE INVENTION

Preferable embodiments of the present invention are described below.

[Method of Producing Silica-Based Particles]

The method of producing silica-based particles according to the present invention comprises the following steps (a), (b), (c) and (e). Sometimes step (d) is performed between step (c) and step (e), or step (g) is performed after step (e). Furthermore sometimes step (f) is performed after step (e).

Each step is described below.

(a) a step in which, when a dispersion liquid of composite oxide particles is prepared by simultaneously adding an aqueous silicate solution and/or an acidic silicic acid solution and an aqueous solution of an alkali-soluble inorganic compound in an alkali aqueous solution or in an alkali aqueous solution with seed particles dispersed therein, if required, the aqueous silicate solution and/or the acidic silicic acid solution and the aqueous solution of alkali-soluble inorganic compound are added so that the molar ratio of $MO_x/SiO_2$ are in a range from 0.01 to 2, herein $MO_x$ denoting an inorganic oxide other than silica and $SiO_2$ denoting silica to prepare the dispersion liquid of composite oxide particles with an average diameter ($D_{p1}$) in a range from 3 to 300 nm.

(b) a step in which the aqueous silicate solution and/or the acidic silicic acid solution and the aqueous solution of alkali-soluble inorganic compound are added at the molar ratio $MO_x/SiO_2$ smaller than that employed in the step (a) above to prepare a dispersion liquid of the composite oxide particles with the average diameters ($D_{p2}$) of up to 500 nm.

(c) a step in which an acid is added to the dispersion liquid of composite oxide particles and then at least a portion of elements constituting the composite oxide particles other than silicon is removed to prepare a dispersion liquid of silica-based particles.

(d) a step in which an organic silicon compound expressed by the following chemical formula (1) and/or a partially hydrolyzed product thereof, and an alkali aqueous solution, if necessary, are added in the dispersion liquid of silica-based particles obtained in the step (c) above to form a silica-coating layer on the particles:

$$R_nSiX_{(4-n)} \qquad (1)$$

wherein R denotes a not-substituted or substituted hydrocarbon group having 1 to 10 carbon atoms, an acrylic group, an epoxy group, a methacrylic group, amino group, or a $CF_3$ group; X denotes an alkoxy group having 1 to 4 carbon atoms, a silanol group, a halogen or hydrogen; and n indicates an integral number in the range from 0 to 3.

(e) a step in which cleaning is performed according to the necessity, and the dispersion liquid of silica-based particles is aged at a range from the room temperature to 300° C.

(f) a step in which an organic silicon compound expressed by the following chemical formula (1) and/or a partially hydrolyzed product thereof, and an alkali aqueous solution, if necessary, are added in the dispersion liquid of silica-based particles obtained in the step (e) above to form a silica-coating layer on the particles:

$$R_nSiX_{(4-n)} \qquad (1)$$

wherein R denotes a not-substituted or substituted hydrocarbon group having 1 to 10 carbon atoms, an acrylic group, an epoxy group, a methacrylic group, amino group, or a $CF_3$ group; X denotes an alkoxy group having 1 to 4 carbon atoms, a silanol group, a halogen or hydrogen; and n indicates an integral number in the range from 0 to 3.

(g) a step in which cleaning is performed according to the necessity, and then hydrothermal processing is performed at a temperature in the range from 50 to 300° C.

(h) a step in which the organic silicon compound expressed by the following chemical formula (1) and/or a partially hydrolyzed product thereof, and an alkali aqueous solution, if necessary, are added in the dispersion liquid of silica-based particles obtained in the step (g) above to form a silica-coating layer on the particles:

$$R_nSiX_{(4-n)} \qquad (1)$$

wherein R denotes a not-substituted or substituted hydrocarbon group having 1 to 10 carbon atoms, an acrylic group, an epoxy group, a methacrylic group, amino group, or a $CF_3$ group; X denotes an alkoxy group having 1 to 4 carbon atoms, a silanol group, a halogen or hydrogen; and n indicates an integral number in the range from 0 to 3.

Step (a)

One or more silicates selected from the group consisting of an alkali metal silicate, an ammonium silicate, and a silicate of an organic base are preferably used as the silicate. There can be enlisted sodium silicate (water glass) or potassium silicate as the alkali metal silicate, and quaternary ammonium salts such as tetraethyl ammonium salt, and amines such as monoethanol amine, diethanol amine, or triethanol amine as the organic base. The ammonium silicate or the silicate of organic base includes an alkaline solution prepared by adding ammonia, quaternary ammonium hydroxide, and an amine compound in a silicic acid solution.

As the acidic silicic acid solution, it is possible to use a silicic acid solution obtained, for instance, by processing the alkali silicate aqueous solution with a cation exchange resin for removing the alkaline components, and an acidic silicic acid solution with pH in the range from 2 to 4 and the $SiO_2$ concentration of about 7% or below by weight is especially preferable.

As the inorganic oxide, there can be enlisted one or more of $Al_2O_3$, $B_2O_3$, $TiO_2$, $ZrO_2$, $SnO_2$, $Ce_2O_3$, $P_2O_5$, $Sb_2O_3$, $MoO_3$, $ZnO_2$, $WO_3$, and the like. As inorganic composite oxides, there can be enlisted, for instance, $TiO_2$—$Al_2O_3$ and $TiO_2$—$ZrO_2$.

As raw materials for the inorganic oxides as described above, it is preferable to use an alkali-soluble inorganic compound, and it is possible to enumerate alkali metal salts or alkali-earth salts of an oxoacid metal salt or an oxoacid non-metal salt, ammonium salts, and quarternary ammonium salts constituting the inorganic oxides. More specifically, it is preferable to use sodium aluminate, sodium tetraborate, zirconyl ammonium carbonate, potassium antimonate, potassium stannate, sodium aluminosilicate, sodium molybdate, cerium ammonium nitrate, sodium phosphate and the like.

For preparing a dispersion liquid of composite oxide particles, previously each alkali aqueous solution of the inorganic compounds is prepared separately or a mixed aqueous solution is prepared, and the aqueous solution is gradually added in an alkali aqueous solution, and preferably in the alkali aqueous solution with the pH of 10 or more with agitation according to a target mixing ratio of silica and the inorganic oxide other than silica. The addition may be performed either continuously or intermittently, but preferably silica and the inorganic oxide other than silica are added at the same time.

A mixing ratio of a quantity of raw materials for silica added in the alkali aqueous solution and that of raw materials for the inorganic oxide compound as expressed by the molar ratio $MO_x/SiO_2$ ($SiO_2$ denoting silica and $MO_x$ denoting the inorganic oxide other than silica) is preferably adjusted to the range from 0.01 to 2, and more preferably to the range from 0.1 to 1.5, until the composite oxide particles having the average diameter in the range from 3 to 300 nm and more preferably in the range from 5 to 100 nm (referred to as primary particles below) are obtained. When the molar ratio is less than 0.01, a cavity volume of the finally obtained silica-based particles is not larger sufficiently. On the other hand, when the molar ratio is more than 2, it is difficult to obtain spherical composite oxide particles, and even if the spherical composite oxide particles can be obtained, the spherical composite oxide particles are broken when elements other than silicon are removed, and as a result, silica-based particles having a porous material and/or cavity inside thereof can not be obtained. Addition of the two materials may be performed adjusting the molar ratio so that the value becomes gradually smaller.

When the molar ratio is in the range from 0.01 to 2, the composite oxide particles have a structure in which silicon atom and elements other than silicon are alternately coupled to each other via an oxygen atom. Namely, in many cases a structure is generated in which oxygen atoms are bonded to 4 bonding sites of the silicon atom, and an element M other than silicon is bonded to each of the oxygen atoms. In this case, when the element M other than silicon is removed in the step (c) described below, also silicon atoms can be removed as a silicate monomer or silicate oligomer in association with the element M without breaking the spherical form of the composite oxide particles.

Even if the molar ratio is within the range defined above, when an average diameter of the composite oxide particles (primary particles) is less than 3 nm, a percentage of the shell in each silica-based particle finally obtained becomes larger, and a cavity volume in the silica-based particles is not sufficiently large. Furthermore, when the average diameter of the composite oxide particles (primary particles) is more than 300 nm, elements M other than silicon can not sufficiently be removed in the step (c), and a cavity volume in the silica-based particles does not become sufficiently larger, which makes it difficult to obtain particles with a low refractive index.

In the production method according to the present invention, when a dispersion liquid of composite oxide particles is prepared, a dispersion liquid with seed particles dispersed therein may be used as a starting material. In this case, any of inorganic oxides such as $SiO_2$, $Al_2O_3$, $TiO_2$, $ZrO_2$, $SnO_2$ and $CeO_2$ or composite oxides of the materials such as, for instance, $SiO_2$—$Al_2O_3$, $TiO_2$—$Al_2O_3$, $TiO_2$—$ZrO_2$, $SiO_2$—$TiO_2$, and $SiO_2$—$TiO_2$—$Al_2O_3$ may be used, and generally the material can be used as a sol. The dispersion liquid of the seed particles as described above can be prepared by any known method. For instance, the dispersion liquid can be obtained by adding an acid or an alkali in a metal salt corresponding to any of the inorganic oxides, in a mixture of the metal salts, or in a metal alcoxide for hydrolysis and aging the mixture, if required.

The aqueous solution of the compound is added with agitation according to the similar procedure for adding the solution in the alkali aqueous solution, in the alkali aqueous solution with the seed particles dispersed therein, and more preferably in the alkali aqueous solution with the seed particles dispersed therein and with the pH or 10 or more. When the composite oxide particles are grown by using seed particles as described above, control over the particle diameter of the grown particles is easy, and particles having relatively uniform size can be obtained. A ratio of raw material for silica versus the inorganic compound each added in the dispersion liquid of seed particles is the same employed when adding the materials in the alkali aqueous solution.

The raw material for silica and that for the inorganic material have high solubility in the alkali side. However, when the two materials are mixed with each other in a pH zone of the high solubility, solubility of oxoacid ions such as silicate ion and aluminate ion drops, and the composite products of the materials are segregated and grow to colloidal particles, or are deposited to the seed particles to grown into particles.

When the dispersion liquid of composite oxide particles is prepared, also the organic silicon compound expressed by the chemical formula (1) described below and/or a hydrolyte thereof may be added as a raw material for silica in the alkali aqueous solution.

As the organic silicon compounds, there can be enumerated the following materials: tetramethoxysilane, tetraethoxysilane, tetraisopropoxysilane, methyl trimethoxysilane, dimethyl dimethoxysilane, phenyl trimethoxysilane, diphenyl dimethoxysilane, methyl trimethoxysilane, dimethyl diethoxysilane, phenyl triethoxysilane, diphenyl diethoxysilane, isobutyl trimethoxysilane, vinyl trimethoxysilane, vinyl triethoxysilane, vinyl-tris(β-methoxyethoxy)silane, 3,3,3-trifluoropropyl trimethoxysilane, methyl-3,3,3-trifluoropropyl dimethoxysilane, β(3,4 epoxycyclohexyl) ethyl trimethoxysilane, γ-glycidoxytripropyl trimethoxysilane, γ-glycidoxypropyl methyl diethoxysilane, γ-glycidoxypropyl triethoxysilane, γ-methacryloxypropyl methyl dimethoxysilane, γ-methacryloxypropyl trimethoxysilane, γ-methacryloxypropyl methyl diethoxysilane, γ-methacryloxypropyl triethoxysilane, N-β(aminoethyl)γ-aminopropyl methyl dimethoxysilane, N-β(aminoethyl)γ-aminopropyl trimethoxysilane, N-β(aminoethyl)γ-aminopropyl triethoxysilane, γ-aminopropyl trimethoxysilane, γ-aminopropyl triethoxysilane, N-phenyl-γ-aminopropyl trimethoxysilane, γ-mercaptopropyl trimethoxysilane, trimethyl silanole, methyl trichlorosilane, methyl dichlorosilane, dimethyl dichlorosilane, trimethyl chlorosilane, phenyl trichlorosilane, diphenyl dichlorosilane, vinyl trichlorosilane, trimethyl bromosilane, and diethylsilane, and the like.

In the organic silicon compound, when n is in the range from 1 to 3, the hydrophilicity is low. Therefore, it is preferable to previously hydrolyze the compound so that the compound can homogeneously be mixed in the reaction system. Any known method may be employed for hydrolyzing the compounds. When a hydroxide of an alkali metal, ammonia water, or a basic compound such as amine is used as a catalyst for hydrolysis, the basic catalyst may be removed after the hydrolysis and the solution may be converted to an acidic solution for use. When a hydrolyzed product is prepared by using an acidic catalyst such as an organic acid or an inorganic acid, the acidic catalyst is preferably removed, for instance, by ion exchange. Furthermore it is desirable to use the hydrolyzed product of the organic silicon compound in a form of an aqueous solution. The term of aqueous solution as used herein means the state where the hydrolyzed product is transparent and does not have white turbidity as gel.

Step (b)

Then, the primary particles are grown by adding an aqueous silicate solution and/or an acidic silicic acid solution and an aqueous solution of alkali-soluble inorganic compound at a molar ratio $MO_x/SiO_2$ smaller than that employed in the step (a) under the average diameters of the particles ($D_{p2}$) grows up to 500 nm. The addition may be performed either continuously or intermittently like in the step (a), but the both materials are preferably added simultaneously. Furthermore, the addition may be performed by gradually making smaller the molar ratio $MO_x/SiO_2$ in the step (b).

The ratio of the molar ratio $MO_x/SiO_2$ in the step (a) (A) versus that in the step (b) (B) [B/A] is preferably 0.8 or below.

When the value B/A is 1 or more, a silica-rich shell can not be generated, which makes it difficult to obtain spherical composite oxide particles. Even if the spherical composite oxide particles can be obtained, the spherical composite oxide particles are broken in the step of removing elements other than silicon in the step (c), and as a result silica-based particles having porous materials and/or cavities inside thereof can not be obtained.

When the value B/A is less than 1, the surface layer of the composite oxide particles becomes silica-rich, which makes it easier to form a shell, and even when elements other than silicon are removed in the step (c), the spherical composite oxide particles are not broken, which makes it possible to obtain silica-based particles having porous materials and/or cavities inside thereof in stable state.

A ratio ($D_{p1}/D_{p2}$) of average diameter ($D_{p1}$) of the composite oxide particles versus average diameter ($D_{p2}$) of particles (secondary particles) obtained by growing the particles above is preferably in the range from 0.4 to 0.98, and more preferably in the range from 0.5 to 0.96.

When the value of $D_{p1}/D_{p2}$ is less than 0.4, the elements M other than silicon can not be removed sufficiently in the step (c) and the cavity volume in the silica-based particles does not become sufficiently larger, which makes it difficult to obtain particles having a low refractive index. When the value of $D_{p1}/D_{p2}$ is more than 0.98, sometimes silica-based particles having porous materials and/or cavities can not be obtained according to diameter of particles (more specifically, when $D_{p2}$ is 20 nm or below, and especially 10 nm or below).

In the present invention, in the step (b), after the average diameter of the composite oxide particles (primary particles) substantially grows up to the range from 3 to 300 nm, an electrolytic salt may be added at a ratio of a mole number of the electrolytic salt ($M_E$) versus that of $SiO_2$ ($M_S$) [$M_E/M_S$] in the range from 0.1 to 10 and more preferably in the range from 0.2 to 8.

As the electrolytic salt, there can be enumerated water-soluble ones such as sodium chloride, potassium chloride, sodium nitrate, potassium nitrate, sodium sulfate, potassium sulfate, ammonium nitrate, ammonium sulfate, magnesium chloride, and magnesium nitrate.

The electrolytic salt may be added all at once at this point of time, or added continuously or intermittently adding an alkali metal silicate or an inorganic compound other than silica to grow composite oxide particles.

Although a quantity of the electrolytic salt to be added changes according to a concentration of the dispersion liquid of the composite oxide particles, when the molar ratio above ($M_E/M_S$) is less than 0.1, the effect obtained by adding the electrolytic salt is insufficient, and the composite oxide particles can not maintain the spherical form and are broken when an acid is added in the step (c) for removing at least a portion of elements other than silicon constituting the composite oxide particles, which makes it difficult to obtain silica-based particles having porous materials and/or cavities inside thereof. The effect obtained by adding the electrolytic salt is presumably that silica content becomes higher at a surface of the composite oxide having grown into particles although the reason has not been clarified and the silica not soluble in an acid functions as a protective film for the composite oxide particles.

Also when the molar ratio $M_S/M_E$ is more than 10, the effect provided by adding the electrolyte is not improved, and the economical efficiency drops, for instance, because new fine particles are generated.

When the electrolytic salt is added, if the average diameter of the primary particles is less than 3 nm, new fine particles grow, and selective growth of the primary particles does not occur, and sometimes distribution of diameters of the composite oxide particles becomes heterogeneous. When the electrolytic salt is added, if the average diameter of the primary particles is more than 300 nm, a long time is required for removing elements other than silicon in step (c), or even the process it self becomes difficult. The average diameter of the composite oxide particles (secondary particles) obtained as described above is, like the finally obtained silica-based particles, in the range from 5 to 500 nm.

Step (c)

In step (c), a portion of or all of the elements other than silicon and constituting the composite oxide particles are removed from the composite oxide particles.

The elements are removed from the composite oxide particles, for instance, by adding a mineral acid or an organic acid to dissolve the elements for removal, by contacting the particles to a cation exchange resin for ion exchange removal, or by combining the methods as described above.

Also in step (c), the elements other than silicon may be removed, after the electrolytic salt is added as described above to adjust the molar ratio $M_S/M_E$ to the range from 0.1 to 10, and more preferably to the range from 0.2 to 8, by adding the mineral acid or the organic acid to dissolve the elements for removal, by contacting the particles to the cation exchange resin for ion exchange removal, or by combining the methods as described above.

A concentration of the dispersion liquid of composite oxide particles is preferably in the range from 0.1 to 50 wt %, and more preferably in the range from 0.5 to 25 wt % when calculated as that of the oxide, although the desirable concentration varies according to the processing temperature. When the concentration of the composite oxide particles is less than 0.1 wt %, a quantity of dissolved silica increases, which sometimes makes it difficult for the composite oxide particles to maintain the form, and even when the composite oxide particles can maintain the form, the concentration becomes lower, which lowers the processing efficiency. When the concentration of the composite oxide particles is over 50 wt %, the particles are not dispersed sufficiently, which sometimes makes it difficult to uniformly or efficiently remove elements other than silica at fewer times from the composite oxide particles having a high content of the elements other than silica.

Removal of the elements other than silica is preferably continues until the $MO_x/SiO_2$ in the obtained silica-based particles is in the range from 0.0001 to 0.2, and more preferably in the range from 0.0001 to 0.1.

Step (d)

Step (d) is optional.

As the organic silicon compound expressed by the chemical formula (1), the organic silicon compounds as those used in step (a) may be used, and when the organic silicon compound expressed by the chemical formula (1) in which n is equal to 0 (n=0), it is preferable to use a partially hydrolyzed product of the organic silicon compound like that used in the step (a) above.

Because the silica-coating layer as described above is condensed, the inside is preserved in a gas phase or in a liquid phase with a low refractive index, and when used for forming a coating layer, intrusion of a material with a high refractive index such as resin for painting into the inside is prevented, and a coating film with a low refractive index can be formed.

Furthermore, because the silica-coating layer is condensed, even when there is the gas phase portion inside thereof, water molecules do not go into the inside. Namely the silica-coating layer has high water resistance and can prevent the coating film from becoming turbid and white.

Because the silica-coating layer is condensed, a ratio $(S_B/S_c)$ of an actually measured specific surface area $(S_B)$ of the silica-based particles versus a specific surface area $(S_c)$ calculated from the average diameter is small, and conceivably because surface activity of the silica-based particles is low, dispersibility of the silica-based particles in a resin for a paint is high, and the obtained paint is excellent in the stability.

When the organic silicon compound with n of 1 to 3 is used for forming a silica-coating layer, the dispersibility in an organic solvent is high, and a dispersion liquid of silica-based particles with high affinity to resin can be obtained. Furthermore, the surface may be processed, for instance, with a silane coupling agent, but because the dispersibility in an organic solvent and the affinity with resin are high, the processing may be omitted.

When an organic silicon compound containing fluorine is used for forming a silica-coating layer, a coating layer containing fluorine atoms is formed, so that the obtained particles has lower refractive index and the dispersibility in an organic solvent is high, and therefore it is possible to obtain a dispersion liquid of silica-based particles having high affinity with resin. As the organic silicon compound containing fluoride, there can be enumerated 3,3,3-trifluoropropyl trimethoxysilane, methyl-3,3,3-trifluoropropyl dimethoxysilane, heptadecafluorodecyl trichlorosilane, heptadecafluorodecyl trichlorosilane, heptadecafluorodecyl trimethoxysilane, trifluoropropyl trimethoxysilane, tridecafluorooctyl trimethoxysilane, and the like. Furthermore also the compounds expressed by the chemical formula (2) or the chemical formula (3) provide the same effect, and therefore the compounds may advantageously be used for the purpose.

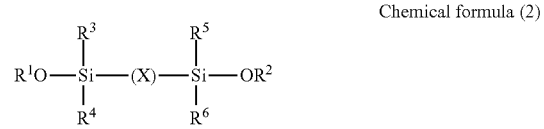

Chemical formula (2)

Chemical formula (3)

In the chemical formulas (2) and (3), $R^1$ and $R^2$, and $R^1$ and $R^7$ may be identical to or different from each other respectively, and denote any of an alkyl group, a halogenated alkyl group, an aryl group, an alkyl aryl group, an aryl alkyl group, an alkenyl group, a hydrogen atom, or a halogen atom.

$R^3$ to $R^6$ may be identical to or different from each other, and denotes any of an alkoxy group, an alkyl group, a halogenated alkyl group, an aryl group, an alkyl aryl group, an aryl alkyl aryl group, an alkenyl group, a hydrogen atom, or a halogen atom.

X denotes $—C(C_aH_bF_c)—$, and a is a even integral number of 2 or more, and b and c are even integral numbers of 0 or more.

Methoxysilane expressed as $(CH_3O)_3SiC_2H_4 C_6F_{12}C_2H_4Si(CH_3O)_3$ is, for instance, one of the compounds expressed by the chemical formula (2).

Step (e)

In step (e), the dispersion liquid of silica-based particles is subjected to cleaning, if required, and then is aged at a temperature from the temperature to 300° C.

The dispersion liquid, from which the elements have been removed, can be cleaned by any known method such as ultrafiltration according to the necessity. A portion of the elements other than silicon dissolved in the dispersion liquid during cleaning are removed. In this step, if the dispersion liquid is subjected to ultrafiltration after a portion of alkali metal ions, alkali earth metal ions, ammonium ions and the like has been removed, a sol in which silica-based particles having high stability in the dispersed state can be obtained.

A portion of the elements other than silicon dissolved in the dispersion liquid or a portion of the alkali metal ions, alkali earth metal ions, and ammonium ions dissolved therein can be removed also by contacting the dispersion liquid with a cation exchange resin and/or an anion exchange resin. The cleaning step becomes more effective when the dispersion liquid is heated before cleaning.

By subjecting the dispersion liquid to cleaning, it is possible to effectively reduce contents of alkali metal oxides and ammonia in the silica-based particles obtained through the hydrothermal processing as described above, and because of this feature, properties of the paint for forming a coating film obtained by using the silica-based particles described later such as the stability and adaptability for forming a film are improved, and the obtained coating film is excellent in the strength.

Then the dispersion liquid is aged, generally for 1 to 24 hours, at a temperature in the range from the room temperature to 300° C., and more preferably at a temperature in the range from 50 to 250° C. When aging is performed, the silica-coating layer becomes more dense and tight, and materials with a high refractive index can not come into the particles as described above, which makes it possible to form a coating film having a low refractive index.

Step (f)

The step (f) is optional, and content of the step (f) is the same as that of the step (d) excluding the point that the step (f) is performed after the step (e).

Step (g)

Step (g) is optional, and in this step, cleaning is performed according the necessity, and then the hydrothermal processing is performed at a temperature in the range from 50 to 300° C. Like in step (e), any known method can be employed for cleaning.

When the temperature employed for the hydrothermal processing is less than 50° C., contents of alkali metal oxides and/or ammonia in the finally obtained silica-based particles or the dispersion liquid of silica-based particles can not effectively be reduced, and the effects for improving the properties such as stability and adaptability to forming a coating film becomes insufficient, and also improvement in the strength of obtained coating films is insufficient.

When the temperature employed for the hydrothermal processing is over 300° C., properties of the paint for forming a coating film such as the stability, adaptability to forming a coating film, and strength are not further improved, and in some cases the silica-based particles aggregate.

When the hydrothermal processing is performed at a temperature in the range from 150° C. to 300° C., a coating film obtained by using the silica-based particles is excellent in the water resistance, and when drops of water drop on the coating film, the water can easily be wiped off. Also, when the drops of water are dried, trace of the water drops is hardly left, which is advantageous.

In the present invention, the hydrothermal processing can be performed by repeating the step (g) described above. In this case, contents of alkali metal oxide and/or ammonia in the silica-based particles or in the dispersion liquid of the silica-based particles obtained by repeating the step (g) can be reduced.

Step (h)

Step (h) is optional, and contents of the step (h) is the same as step (d) excluding the point that step (h) is performed after step (g).

A variation flow of the steps (c) and on is, for instance, as shown below.

Step (c): Removal of elements
↓ ← Step (d): Coating with silica
Step (e): Aging
↓ ← Step (f): Coating with silica
Step (g): Hydrothermal processing
↓ ← Step (h): Coating with silica An average diameter of the silica-based particles obtained as described above is in the range from 5 to 500 nm, and preferably in the range from 10 to 400 nm. When the average diameter is less than 5 nm, a sufficient volume of cavities can not be obtained, which makes it difficult to achieve the effect of lowering the refractive index. When the average diameter is over 500 nm, it is difficult to obtain a stable dispersion liquid, and sometimes irregularities are generated on a surface of the coating film containing the particles, and also the haze becomes higher.

An average diameter of the silica-based particles according to the present invention can be obtained by photographing the silica-based particles with a transmission electron microscope (TEM), measuring diameter of 100 particles, and calculating the average value.

An average thickness of outer shell of the silica-based particles is preferably in the range from 0.5 to 20 nm, and more preferably in the range from 1 to 15 nm. When a particle has an outer shell with the thickness of less than 0.5 nm, the particle can not maintain the form as a particle, so that it is difficult to obtain particles with the thickness of less than 0.5 nm. When the thickness is over 20 nm, percentages of porous materials and/or cavities inside the outer shell become lower, and therefore the particles can not provide the effect of lowering the refractive index.

Furthermore, a content of alkali metal oxides in the silica-based particles or a dispersion liquid of the silica-based particles as calculated as that of $M_2O$ (M: alkali metal element) per particle is preferably 5 ppm or below, and more preferably 2 ppm or below. When the content of alkali metal oxides is over 5 ppm, stability of a paint for forming a coating film with the silica-based particles blended therein is not sufficient. In this case, sometimes the viscosity becomes higher, the adaptability to forming a coating film drops with the strength of an obtained coating film lowered, and in addition the thickness of the coating film may be not uniform.

Content of ammonia and/or ammonium ions in the silica-based particles or the dispersion liquid of the silica-based particles when calculated as that of $NH_3$ per silica-based particle is preferably 1500 ppm or below, and more preferably 1000 ppm or below. When the ammonia contents is over 1500 ppm, like in the case where the content of the alkali metal oxide is too high, the viscosity becomes higher, the adaptability to forming a coating film drops with the strength of an obtained coating film lowered, and in addition the thickness of the coating film may be not uniform.

In the method of producing silica-based particles according to the present invention, a sol of the silica-based particles dispersed in an organic solvent can be obtained by substituting the obtained dispersion liquid of silica-based particles with an organic solvent by using an ultrafiltration membrane, a rotary evaporator or the like.

The obtained silica-based particles may be processed with a silane coupling agent by employing any known method.

Furthermore, in the method of producing silica-based particles according to the present invention, the silica-based particles can be cleaned, and then dried and calcinated.

The silica-based particles obtained as described above have porous materials and/or cavities inside thereof and also have a low refractive index. Therefore, a coating film prepared by using the silica-based particles has a low refractive index, and is excellent in the reflection preventing property.

[Silica-Based Particles]

The silica-based particles according to the present invention have porous materials and/or cavities inside an outer shell, and a ratio ($S_B/S_C$) of a specific surface area ($S_B$) of the particles measured by the BET method versus a specific surface area ($S_C$) expressed by the following expression is in a range from 1.1 to 5, and preferably in the range from 1.2 to 3:

$$S_C(m^2/g)=6000/Dp(nm)*\rho$$

wherein Dp denotes an average diameter (nm) of the silica-based particles and $\rho$ denotes a density (g/ml).

Herein the specific surface area ($S_B$) is a value obtained by heating the silica-based particles for 2 hours at 100° C. and then measuring the surface area by the BET method ($N_2$ absorption method). On the other hand, the specific surface area ($S_C$) is a value obtained by calculation based on the assumptions that the silica-based particle is spherical and that a density $\rho$ of the particle is 2.2 which is equivalent to a density of silica (g/ml), namely that the particle is a non-porous silica particle having a spherical form.

When the ratio ($S_B/S_C$) of the specific surface area ($S_B$) versus the specific surface area ($S_C$) is less than 1.1, a pore volume or a cavity volume in the porous material is small, and the effect of lowering the refractive index is not sufficient. On the other hand, when the ratio ($S_B/S_C$) is over 5, the outer shell become porous. In this case, dispersity of the particles in a resin for preparing a paint is not sufficient, and also stability of the obtained paint is not sufficient, which makes strength of a coating film prepared by using the silica-based particles insufficient. Furthermore, sometimes water molecules come into inside of the silica-based particles, which causes white turbidity in the coating film and furthermore makes the water resistance of the coating film insufficient.

The ratio ($S_B/S_C$) is preferably in the range from 1.2 to 3.

An average diameter of silica-based particles according to the present invention is preferably in the range from 5 to 500 nm, and more preferably in the range from 10 to 400 nm. When the average diameter is less than 5 nm, a percentage of the outer shell becomes higher, and sometimes the sufficient effect of lowering the refractive index can not be obtained. When the average diameter is over 500 nm, it becomes difficult to obtain a stable dispersion liquid or a stable paint, and irregularities may be generated on a surface of a coating film containing the silica-based particles with the haze becoming more remarkable. Furthermore an average diameter of the silica-based particles according to the present invention can be obtained by photographing the silica-based particles with a transmission electron microscope (TEM), measuring diameters of 100 particles, and calculating an average of the measured values.

An average thickness of the outer shells of the silica-based particles is preferably in the range from 0.5 to 20 nm, and more specifically in the range from 1 to 15 nm. When the thickness is less than 0.5 nm, the particle can not maintain the spherical form, which makes it difficult to obtain the silica-based particles. When the thickness is over 20 nm, a percentage of the porous material and/or cavities inside the outer shell becomes lower, which makes it difficult to provide the sufficient effect of lowering the refractive index.

The average thickness of outer shells of the silica-based particles can be obtained by measuring thicknesses of shell portions determined according to a difference in contrast in the TEM image described above and calculating an average value from the measured values.

A refractive index of the silica-based particles is preferably in the range from 1.15 to 1.38, and more preferably in the range from 1.15 to 1.35.

It is difficult to obtain silica-based particles with the refractive index of less than 1.15, and when the refractive index is over 1.38, sometimes a refractive index of the coating film prepared by using the silica-based particles is over 1.42, and the reflection preventing property may be insufficient.

A refractive index of the silica-based particles is measured as described below by using Series A, AA produced by CARGILL Corp. as a standard refractive liquid.
(1) A dispersion liquid of the silica-based particles is put in an evaporator to evaporate the dispersion medium.
(2) The dispersion liquid is dried at 120° C. to obtain powder.
(3) Two or three drops of a standard refractive liquid with a known refractive index are dropped on a glass plate, and the powder is mixed in the drops.
(4) The operation (3) above is performed in various types of standard refractive liquids, and refractive indexes of the standard refractive liquids when the mixture solutions become transparent are determined as refractive indexes of the particles.

[Paint for Forming a Coating Film]

The paint for forming a coating film according to the present invention comprises the silica-based particles described above, a matrix for forming a coating film, and an organic solvent blended, if necessary.

The matrix for forming a coating film means a component capable of forming a coating film on a surface of the substrate and can be selected and used from a resin or the like satisfying the conditions such as adhesiveness to a substrate, hardness, coating capability or the like. For instance, there can be enumerated a polyester resin, an acrylic resin, an urethane resin, a polyvinyl chloride resin, an epoxy resin, a melamine resin, a fluorine resin, a silicone resin, a butyral resin, a phenol resin, a vinyl acetate resin, an ultraviolet curing resin, an electron beam curable resin, an emulsion resin, a water-soluble resin, a hydrophilic resin which has been conventionally used, a mixture of the resins and a resin such as a copolymer, variants thereof or the like, or a hydrolyzed organic silicon compounds such as the above-mentioned alkoxysilane or the like, and a partially hydrolyzed product thereof may be used.

When a resin for paint is used as a matrix, for instance, the organic solvent dispersion sol obtained by substituting the dispersion media of the silica-based particle dispersion liquid with an organic solvent such as alcohol, preferably, the silica-based particles with a silica-coating layer formed by an organic silica compound containing an organic group is used, and, the particles are processed by a known coupling agent, if necessary, before the organic solvent dispersion liquid blended in the organic solvent and the resin for coating are diluted with a proper organic solvent to provide an coating liquid.

On the other hand, when a hydrolyzed organic silicon compound is used as a matrix, a partially hydrolyzed product of alkoxysilane is obtained by adding water, an acid or an alkali as a catalyst to the mixture solution of alkoxysilane and alcohol, and the above-mentioned sol is added thereto, and diluted with the organic solvent, if necessary, to obtain an coating liquid.

A weight ratio of the silica-based particle and the matrix in the coating liquid for forming a coating film is preferably in the range of the silica-based particle/matrix from 1/99 to 9/1. When the weight ratio exceeds 9/1, the coating liquid lacks in practicality as the strength of the coating film and the adhesiveness with the substrate. On the other hand, when the weight ratio is less than 1/99, addition of the silica-based particle has an insufficient effect on lowering the refractive index of the coating film, increasing the adhesiveness with the substrate, enhancing the strength of the coating film or the like.

[Substrate with a Coating Film]

In the substrate with a coating film according to the present invention, the coating film comprising the silica-based particles and the matrix for forming a coating film is formed on a surface of the substrate singly or together with another coating film.

The substrate is a substrate with a coating film formed on the surface of glass, polycarbonate, an acryl resin, a PET, a plastic film such as TAC or the like, a plastic film, a plastic lens, a plastic panel or the like, a cathode-ray tube, a fluorescent display, a LCD panel or the like, and the coating film is formed singly or in combination with a protective film, a hard coating film, a planarizing film, high refractive index film, an insulating film, a conductive resin film, a conductive metal particle film, a conductive metal oxide particle film and a primer film or the like used according to the necessity. It is to be understood that the coating film according to the present invention does not need to be formed on the outermost surface when the coating film is used in combination with another film.

This kind of film can be obtained by applying the paint for forming a coating film described above to the substrate by a known method such as the dipping method, the spray method, the spinner method, a roll coating method or the like, drying, and additionally hardening by heating, exposing the film to ultraviolet radiation or the like, if necessary.

The refractive index of the coating film formed on the surface of the above-mentioned substrate has a low refractive index from 1.15 to 1.42 though the refractive index of the coating film varies according to the blend ratio of the silica-based particles, the matrix component or the like and the refractive index of the matrix to be used. It is to be understood that the refractive index of the silica-based particles according to the present invention is in the range from 1.15 to 1.38. The reasons are that the silica-based particles according to the present invention has porous materials and/or cavities inside thereof, and that the matrix-forming component such as a resin rests outside the particles and therefore the cavities inside the silica-based particles are maintained.

Furthermore, when the refractive index of the above-mentioned substrate with a coating film is 1.60 or less, the coating film including the silica-based particles according to the present invention is recommended to be formed after forming a coating film (hereinafter referred to as an intermediate film) with the refractive index of 1.60 or more on the surface of the substrate. When the refractive index of the intermediate film is 1.60 or more, the difference from the refractive index of the coating film including the above-mentioned silica-based particles according to the present invention is large enough to obtain a substrate with a coating film excellent in the anti-reflection capability. The refractive index of the intermediate film can be adjusted according to the refractive index of the metal oxide particles used for improving the refractive index of the intermediate coating film, the mixing ratio of the metal oxide particle, the resin or the like, and the refractive index of the resin to be used.

The coating liquid for forming a coating film of the intermediate film is a mixture of the metal oxide particle and the matrix for forming a coating film, and an organic solvent is mixed thereto, if necessary. The same matrix for forming a coating film as the one for forming a coating film including the above-mentioned silica-based particle according to the present invention may be used, and the substrate with a film excellent in adhesiveness between films can be obtained due to the use the same matrix for forming a coating film.

The present invention is described more specifically below with reference to the embodiments.

Example 1

Preparation of Silica-Based Particles (P-1)

A mixture of 100 grams of silica-alumina sol (USBB-120, produced by Catalysts & Chemicals Industries Co., Ltd., average diameter: 25 nm, concentration of $SiO_2 \cdot Al_2O_3$: 20 wt %, $Al_2O_3$ content: 27 wt % in solid phase) and 3900 grams of pure water was heated to 98° C. While this temperature was kept, 405 grams of aqueous solution of sodium silicate with concentration of 1.5 wt % when calculated as that of $SiO_2$ and 405 grams of aqueous solution of sodium aluminate with concentration of 0.5 wt % when calculated as that of $Al_2O_3$ were added to obtain a dispersion liquid of $SiO_2 \cdot Al_2O_3$ primary particles (average diameter: 28 nm) The $MO_X/SiO_2$ molar ratio (A) then was 0.2, and the pH of the reaction liquid was 12.0. [Step (a)]

Next, 3250 grains of aqueous solution of sodium silicate with concentration of 1.5 wt % when calculated as that of $SiO_2$ and 1100 grams of aqueous solution of sodium aluminate with concentration of 0.5 wt % when calculated as $Al_2O_3$ were added to obtain a dispersion liquid of composite oxide particles (1) (secondary particles) (average diameter: 40 nm) The $MO_X/SiO_2$ molar ratio (B) then was 0.07, and the pH of the reaction liquid was 12.0. [Step (b)]

Next, 1125 grams of pure water was added to 500 grams of dispersion liquid of the composite oxide particles (1) with solid-phase concentration of 13 wt % after cleaned with an ultrafiltration membrane. Drops of concentrated hydrochloric acid (concentration: 35.5 wt %) were added so as to set the pH to 1.0 to be dealuminated. Next, while 10 L of hydrochloric acid solution with pH3 and 5 L of pure water were added, aluminate dissolved with the ultrafiltration membrane was separated and cleaned to obtain an aqueous dispersion liquid of silica-based particles (P-1-1) with solid-phase concentration of 20 wt %. [Step (c)]

Next, mixed fluid of 150 grams of water dispersion liquid of the silica-based particles (P-1-1), 500 grams of pure water, 1750 grams of ethanol, and 626 grams of ammonia water with concentration of 28 wt % was heated to 35° C. Then, 190 grams of ethyl silicate ($SiO_2$ concentration: 28 wt %) was added to form a silica-coating layer, and was cleaned with an ultrafiltration membrane, while 5 L of pure water was added, to obtain an aqueous dispersion liquid of silica-based particles (P-1-1) having a silica-coating layer with solid content of 20 wt %. [Step (d)]

Next, ammonia water was added to the aqueous dispersion liquid of silica-based particles (P-1-1) having the silica-coating layer to adjust the pH of the dispersion liquid to be 10.5. Then, the dispersion liquid was aged at 150° C. for 11 hours, and was cooled to the room temperature. Then, the dispersion liquid was ion-exchanged for 3 hours using 400 grams of cation exchange resin (Mitsubishi Kagaku K.K.: Diaion SK1B), and ion-exchanged for 3 hours using 200 g of anion exchange resin (Mitsubishi Kagaku K.K.: Diaion SA20A), and ion-exchanged at 80° C. for 3 hours using 200 g of cation exchange resin (Mitsubishi Kagaku K.K.: Diaion SK1B), to obtain an aqueous dispersion liquid of silica-based particles (P-1-2) of solid content of 20 wt %. At that time, $Na_2O$ and $NH_3$ content per silica-based particle in the aqueous dispersion liquid of silica-based particles (P-1-2) were 6 ppm and 1200 ppm respectively. [Step (e)]

Next, again, the dispersion liquid of silica-based particles (P-1-2) was processed hydrothermally at 150° C. for 11 hours and cooled to the room temperature. The dispersion liquid was ion-exchanged for 3 hours using 400 grams of cation exchange resin (Mitsubishi Kagaku K.K.: Diaion SK1B), and ion-exchanged for 3 hours using 200 g of anion exchange resin (Mitsubishi Kagaku K.K.: Diaion SA20A), and ion-exchanged at 80° C. for 3 hours using 200 g of cation exchange resin (Mitsubishi Kagaku K.K.: Diaion SK1B) to obtain an aqueous dispersion liquid of silica-based particles (P-1-3) of solid content of 20 wt %. At that time, $Na_2O$ and $NH_3$ content per silica-based particle in the dispersion liquid of silica-based particles (P-1-3) were 0.5 ppm and 800 ppm respectively. [Step (g)]

Next, an alcohol dispersion liquid of silica-based particles (P-1) with solid content of 20 wt % was prepared, after ethanol was substituted for the solvent using an ultrafiltration membrane.

Preparation conditions of the silica-based particles (P-1) are given in Table 1. Table 2 shows the characteristics of the silica-based particles (P-1) such as an average diameter, thickness of an outer shell layer, $MO_x/SiO_2$ (molar ratio), $Na_2O$ content, $NH_3$ content, a refractive index, specific surface area ($S_B$), specific surface area ($S_C$), and water resistance of silica-based particles (P-1). The average diameter and the thickness of an outer shell layer were measured using the TEM method, and the refractive index was measured using Cargill's Series A, AA as a standard liquid having a known refractive index.

The water resistance was measured according to the following method.

Mixture solution of 5 grams of ortho-ethyl silicate (TEOS) ($SiO_2$ content: 28 wt %), 19.5 grains of ethanol, 0.14 grams of condensed nitric acid, and 3.4 grams of pure water was agitated at the room temperature for 5 hours to prepare binder component of $SiO_2$ with concentration of 5 wt %. 1.75 grams of alcohol dispersion liquid of silica-based particles (P-1) with solid content of 20 wt % was mixed, and was applied on a glass plate by the spin coat method and was dried at 120° C. for 5 hours to form a transparent film. One drop of distilled water was dropped on the transparent film and was wiped off. A mark of the drop was observed and evaluated according to the following criteria.

No mark of the drop was observed: ⊚

The mark of the drop was observed but disappeared within 5 minutes: ○

The mark of the drop was disappeared in 5 to 20 minutes: Δ

The mark of the drop was observed 20 minutes or more: x

Preparing a Substrate with a Transparent Coating Film (A-1)

50 grams of dispersion liquid of solid content of 5 wt % prepared by diluting alcohol dispersion liquid of the silica-based particles (P-1) with ethanol, 3 grams of acrylic resin (Hitaloid 1007: Hitachi Kasei K.K.), and 47 grams of mixed solvent of iso-propanol and n-butanol at the rate of 1/1 (weight ratio) were sufficiently mixed to prepare a coating liquid.

This coating liquid was applied on a PET film by the bar coater method, and was dried at 80° C. for 1 minute to obtain a substrate with transparent coating film (A-1) with the thickness of 100 nm. Total transmittance, haze, reflectance for a light having 550 nm wavelength, refractive index of the film, adhesiveness, and pencil hardness of the substrate with transparent coating film (A-1) are shown in Table 3.

The total transmittance and the haze are measured by Haze Meter (manufactured by Suga Test Instruments Co., Ltd.) and the reflectance is measured by a spectrophotometer (Ubest-55 manufactured by Jasco Corporation) respectively. Also, the refractive index of the coating film is measured by an ellipsometer (EMS-1 manufactured by ULVAC Inc.). It is to be understood that the total transmittance of the unembrocated PET film is 90.7%, haze thereof is 2.0%, and the reflectance for a light with the wavelength of 550 nm is 7.0%. The pencil hardness is measured by a pencil hardness tester according to JIS K 5400. Namely, a pencil is set at an angle of 45 degrees with respect to a surface of the film, drawn at a constant velocity with a predetermined weight and observed if there is a blemish or not.

On a surface of the substrate with a transparent coating film (A-1), 100 meshes were created by 11 parallel lines in both two directions substantially perpendicular to each other using a knife. A scotch tape was stuck on the surface and the tape was removed. Then the number of remaining meshes without the film being removed was counted to evaluate the adhesiveness by categorizing in any of the following three stages. The results were shown in table 3.

90 or more pieces of meshes remained: ⊚

85-89 pieces of meshes remained: ○

84 or less pieces of meshes remained: Δ

Example 2

Preparation of Silica-Based Particles (P-2)

A mixture of 100 grams of silica-alumina sol (USBB-120, produced by Catalysts & Chemicals Industries Co., Ltd., average diameter: 25 nm, concentration of $SiO_2.Al_2O_3$: 20 wt %, $Al_2O_3$ content: 27 wt % in solid phase) and 3900 grams of pure water was heated to 98° C. While this temperature was kept, 1750 grams of aqueous solution of sodium silicate with concentration of 1.5 wt % when calculated as that of $SiO_2$ and 1750 grams of aqueous solution of sodium aluminate with concentration of 0.5 wt % when calculated as that of $Al_2O_3$ were added to obtain a dispersion liquid of $SiO_2$—$Al_2O_3$ primary particles (average diameter: 35 mm) The $MO_x/SiO_2$ molar ratio (A) then was 0.2, and the pH of the reaction liquid was 12.0. [Step (a)]

Next, 6300 grams of aqueous solution of sodium silicate with concentration of 1.5 wt % when calculated as that of $SiO_2$ and 2100 grams of aqueous solution of sodium aluminate with concentration of 0.5 wt % when calculated as $Al_2O_3$ were added to obtain a dispersion liquid of composite oxide particles (2) (secondary particles) (average diameter: 50 nm) The $MO_x/SiO_2$ molar ratio (B) then was 0.07, and the pH of the reaction liquid was 12.0. [Step (b)]

Next, 1125 grains of pure water was added to 500 grams of dispersion liquid of the composite oxide particles (2) with solid-phase concentration of 13 wt % after cleaned with an ultrafiltration membrane. Drops of concentrated hydrochloric acid (concentration: 35.5 wt %) were added so as to set the pH to 1.0 to be dealuminated. Next, while 10 L of hydrochloric acid solution with pH3 and 5 L of pure water were added, aluminate dissolved with the ultrafiltration membrane was separated and cleaned to obtain an aqueous dispersion liquid of silica-based particles (P-2-1) with solid-phase concentration of 20 wt %. [Step (c)]

Next, mixed liquid of 150 grams of water dispersion liquid of the silica-based particles (P-2-1), 500 grams of pure water, 1750 grams of ethanol, and 626 grams of ammonia water with concentration of 28 wt % was heated to 35° C. Then, 140 grams of ethyl silicate ($SiO_2$ concentration: 28 wt %) was added to form a silica-coating layer, and was cleaned with an ultrafiltration membrane, while 5 L of pure water was added, to obtain an aqueous dispersion liquid of silica-based particles (P-2-1) having a silica-coating layer with solid content of 20 wt %. [Step (d)]

Next, ammonia water was added to the aqueous dispersion liquid of silica-based particles (P-2-1) having the silica-coating layer to adjust the pH of the dispersion liquid to be 10.5. Then, the dispersion liquid was aged at 200° C. for 11 hours, and was cooled to the room temperature. Then, the dispersion liquid was ion-exchanged for 3 hours using 400 grams of cation exchange resin (Mitsubishi Kagaku K.K.: Diaion SK1B), and ion-exchanged for 3 hours using 200 g of anion exchange resin (Mitsubishi Kagaku K.K.: Diaion SA20A), and ion-exchanged at 80° C. for 3 hours using 200 g of cation exchange resin (Mitsubishi Kagaku K.K.: Diaion SK1B), to obtain an aqueous dispersion liquid of silica-based particles (P-2-2) of solid content of 20 wt %. At that time, $Na_2O$ and $NH_3$ content per silica-based particle in the aqueous dispersion liquid of silica-based particles (P-2-2) were 8 ppm and 1500 ppm respectively. [Step (e)]

Next, again, the dispersion liquid of silica-based particles (P-2-2) was processed hydrothermally at 150° C. for 11 hours and cooled to the room temperature. The dispersion liquid was ion-exchanged for 3 hours using 400 grams of cation exchange resin (Mitsubishi Kagaku K.K.: Diaion SK1B), and ion-exchanged for 3 hours using 200 g of anion exchange resin (Mitsubishi Kagaku K.K.: Diaion SA20A), and ion-exchanged at 80° C. for 3 hours using 200 g of cation exchange resin (Mitsubishi Kagaku K.K.: Diaion SK1B) to obtain an aqueous dispersion liquid of silica-based particles (P-2-3) of solid content of 20 wt %. At that time, $Na_2O$ and $NH_3$ content per silica-based particle in the dispersion liquid of silica-based particles (P-2-3) were 0.4 ppm and 60 ppm respectively. [Step (g)]

Next, an alcohol dispersion liquid of silica-based particles (P-2) with solid content of 20 wt % was prepared, after ethanol was substituted for the solvent using an ultrafiltration membrane.

Preparing a Substrate with a Transparent Coating Film (A-2)

A substrate with a transparent coating film (A-2) was prepared in the same method as described in example 1 except that the alcohol dispersion liquid of the silica-based particles (P-2) was substituted for the alcohol dispersion liquid of the silica-based particles (P-1).

Example 3

Preparation of Silica-Based Particles (P-3)

A mixture of 100 grams of silica-alumina sol (USBB-120, produced by Catalysts & Chemicals Industries Co., Ltd., average diameter: 25 nm, concentration of $SiO_2.Al_2O_3$: 20 wt %, $Al_2O_3$ content: 27 wt % in solid phase) and 3900 grams of pure water was heated to 98° C. While this temperature was kept, 109,800 grams of aqueous solution of sodium silicate with concentration of 1.5 wt % when calculated as that of $SiO_2$ and 109,800 grains of aqueous solution of sodium aluminate with concentration of 0.5 wt % when calculated as that of $Al_2O_3$ were added to obtain a dispersion liquid of $SiO_2.Al_2O_3$ primary particles (average diameter: 120 nm) The $MO_X/SiO_2$ molar ratio (A) then was 0.2, and the pH of the reaction liquid was 12.0. [Step (a)]

Next, 251,700 grams of aqueous solution of sodium silicate with concentration of 1.5 wt % when calculated as that of $SiO_2$ and 83,900 grams of aqueous solution of sodium aluminate with concentration of 0.5 wt % when calculated as $Al_2O_3$ were added to obtain a dispersion liquid of composite oxide particles (3) (secondary particles) (average diameter: 171 nm). The $MO_X/SiO_2$ molar ratio (B) then was 0.07, and the pH of the reaction liquid was 12.0. [Step (b)]

Next, 1125 grams of pure water was added to 500 grams of dispersion liquid of the composite oxide particles (3) with solid-phase concentration of 13 wt % after cleaned with an ultrafiltration membrane. Drops of concentrated hydrochloric acid (concentration: 35.5 wt %) were added so as to set the pH to 1.0 to be dealuminated. Next, while 10 L of hydrochloric acid solution with pH3 and 5 L of pure water were added, aluminate dissolved with the ultrafiltration membrane was separated and cleaned to obtain an aqueous dispersion liquid of silica-based particles (P-3-1) with solid-phase concentration of 20 wt %. [Step (c)]

Next, mixed liquid of 150 grams of water dispersion liquid of the silica-based particles (P-3-1), 500 grams of pure water, 1750 grams of ethanol, and 626 grams of ammonia water with concentration of 28 wt % was heated to 35° C. Then, 33 grams of ethyl silicate ($SiO_2$ concentration: 28 wt %) was added to form a silica-coating layer, and was cleaned with an ultrafiltration membrane, while 5 L of pure water was added, to obtain an aqueous dispersion liquid of silica-based particles (P-3-1) having a silica-coating layer with solid content of 20 wt %. [Step (d)]

Next, ammonia water was added to the aqueous dispersion liquid of silica-based particles (P-3-1) having the silica-coating layer to adjust the pH of the dispersion liquid to be 10.5. Then, the dispersion liquid was aged at 150° C. for 11 hours, and was cooled to the room temperature. Then, the dispersion liquid was ion-exchanged for 3 hours using 400 grams of cation exchange resin (Mitsubishi Kagaku K.K.: Diaion SK1B), and ion-exchanged for 3 hours using 200 g of anion exchange resin (Mitsubishi Kagaku K.K.: Diaion SA20A), and ion-exchanged at 80° C. for 3 hours using 200 g of cation exchange resin (Mitsubishi Kagaku K.K.: Diaion SK1B), to obtain an aqueous dispersion liquid of silica-based particles (P-3-2) of solid content of 20 wt %. At that time, $Na_2O$ and $NH_3$ content per silica-based particle in the aqueous dispersion liquid of silica-based particles (P-3-2) were 10 ppm and 1200 ppm respectively. [Step (e)]

Next, again, the dispersion liquid of silica-based particles (P-3-2) was processed hydrothermally at 150° C. for 11 hours and cooled to the room temperature. The dispersion liquid was ion-exchanged for 3 hours using 400 grams of cation exchange resin (Mitsubishi Kagaku K.K.: Diaion SK1B), and ion-exchanged for 3 hours using 200 g of anion exchange resin (Mitsubishi Kagaku K.K.: Diaion SA20A), and ion-exchanged at 80° C. for 3 hours using 200 g of cation exchange resin (Mitsubishi Kagaku K.K.: Diaion SK1B) to obtain an aqueous dispersion liquid of silica-based particles (P-3-3) of solid content of 20 wt %. At that time, $Na_2O$ and $NH_3$ content per silica-based particle in the dispersion liquid of silica-based particles (P-3-3) were 0.4 ppm and 600 ppm respectively. [Step (g)]

Next, an alcohol dispersion liquid of silica-based particles (P-3) with solid content of 20 wt % was prepared, after ethanol was substituted for the solvent using an ultrafiltration membrane.

Preparing a Substrate with a Transparent Coating Film (A-3)

A substrate with a transparent coating film (A-3) was prepared in the same method as described in example 1 except that the alcohol dispersion liquid of the silica-based particles (P-3) was substituted for the alcohol dispersion liquid of the silica-based particles (P-1).

Example 4

Preparation of Silica-Based Particles (P-4)

In the same method in example 2, the dispersion liquid of $SiO_2.Al_2O_3$ primary particles (average diameter: 35 nm) with 20 wt % solid content was prepared. [Step (a)]

Next, 3300 grams of aqueous solution of sodium sulfate with concentration of 1.5 wt % (molar ratio: 0.5) was added, and 6300 grams of aqueous solution of sodium silicate with concentration of 1.5 wt % when calculated as that of $SiO_2$ and 2100 grams of aqueous solution of sodium aluminate with concentration of 0.5 wt % when calculated as $Al_2O_3$ were added to obtain a dispersion liquid of composite oxide particles (4) (secondary particles) (average diameter: 50 nm)

The MO$_x$/SiO$_2$ molar ratio (B) then was 0.15, and the pH of the reaction liquid was 12.0. [Step (b)]

Next, 1125 grams of pure water and 100 grams of sodium sulfate with concentration of 0.5 wt % (molar ratio: 0.004) were added to 500 grams of dispersion liquid of the composite oxide particles (4) with solid-phase concentration of 13 wt % after cleaned with an ultrafiltration membrane. Drops of concentrated hydrochloric acid (concentration: 35.5 wt %) were added so as to set the pH to 1.0 to be dealuminated. Next, while 10 L of hydrochloric acid solution with pH3 and 5 L of pure water were added, aluminate dissolved with the ultrafiltration membrane was separated and cleaned to obtain an aqueous dispersion liquid of silica-based particles (P-4-1) with solid-phase concentration of 20 wt %. [Step (c)]

Next, mixed liquid of 150 grams of water dispersion liquid of the silica-based particles (P-4-1), 500 grams of pure water, 1750 grams of ethanol, and 626 grams of ammonia water with concentration of 28 wt % was heated to 35° C. Then, 140 grams of ethyl silicate (SiO$_2$ concentration: 28 wt %) was added to form a silica-coating layer, and was cleaned with an ultrafiltration membrane, while 5 L of pure water was added, to obtain an aqueous dispersion liquid of silica-based particles (P-4-1) having a silica-coating layer with solid content of 20 wt %. [Step (d)]

Next, ammonia water was added to the aqueous dispersion liquid of silica-based particles (P-4-1) having the silica-coating layer to adjust the pH of the dispersion liquid to be 10.5. Then, the dispersion liquid was aged at 150° C. for 11 hours, and was cooled to the room temperature. Then, the dispersion liquid was ion-exchanged for 3 hours using 400 grams of cation exchange resin (Mitsubishi Kagaku K.K.: Diaion SK1B), and ion-exchanged for 3 hours using 200 g of anion exchange resin (Mitsubishi Kagaku K.K.: Diaion SA20A), and ion-exchanged at 80° C. for 3 hours using 200 g of cation exchange resin (Mitsubishi Kagaku K.K.: Diaion SK1B), to obtain an aqueous dispersion liquid of silica-based particles (P-4-2) of solid content of 20 wt %. At that time, Na$_2$O and NH$_3$ content per silica-based particle in the aqueous dispersion liquid of silica-based particles (P-4-2) were 7 ppm and 900 ppm respectively. [Step (e)]

Next, again, the dispersion liquid of silica-based particles (P-4-2) was processed hydrothermally at 150° C. for 11 hours and cooled to the room temperature. The dispersion liquid was ion-exchanged for 3 hours using 400 grams of cation exchange resin (Mitsubishi Kagaku K.K.: Diaion SK1B), and ion-exchanged for 3 hours using 200 g of anion exchange resin (Mitsubishi Kagaku K.K.: Diaion SA20A), and ion-exchanged at 80° C. for 3 hours using 200 g of cation exchange resin (Mitsubishi Kagaku K.K.: Diaion SK1B) to obtain an aqueous dispersion liquid of silica-based particles (P-4-3) of solid content of 20 wt %. At that time, Na$_2$O and NH$_3$ content per silica-based particle in the dispersion liquid of silica-based particles (P-4-3) were 0.3 ppm and 700 ppm respectively. [Step (g)]

Next, an alcohol dispersion liquid of silica-based particles (P-4) with solid content of 20 wt % was prepared, after ethanol was substituted for the solvent using an ultrafiltration membrane.

Preparing a Substrate with a Transparent Coating Film (A-4)

A substrate with a transparent coating film (A-4) was prepared in the same method as described in example 1 except that the alcohol dispersion liquid of the silica-based particles (P-4) was substituted for the alcohol dispersion liquid of the silica-based particles (P-1).

Example 5

Preparation of Silica-Based Particles (P-5)

In the same method in example 2, the dispersion liquid of SiO$_2$—Al$_2$O$_3$ primary particles (average diameter: 35 nm) with 20 wt % solid content was prepared. [Step (a)]

Next, 6600 grams of aqueous solution of sodium sulfate with concentration of 1.5 wt % (molar ratio: 1.0) was added, and 6300 grains of aqueous solution of sodium silicate with concentration of 1.5 wt % when calculated as that of SiO$_2$ and 2100 grams of aqueous solution of sodium aluminate with concentration of 0.5 wt % when calculated as Al$_2$O$_3$ were added to obtain a dispersion liquid of composite oxide particles (5) (secondary particles) (average diameter: 50 nm) The MO$_x$/SiO$_2$ molar ratio (B) then was 0.07, and the pH of the reaction liquid was 11.0. [Step (b)]

Next, 1125 grains of pure water and 100 grains of sodium sulfate with concentration of 0.5 wt % (molar ratio: 0.004) were added to 500 grams of dispersion liquid of the composite oxide particles (5) with solid-phase concentration of 13 wt % after cleaned with an ultrafiltration membrane. Drops of concentrated hydrochloric acid (concentration: 35.5 wt %) were added so as to set the pH to 1.0 to be dealuminated. Next, while 10 L of hydrochloric acid solution with pH3 and 5 L of pure water were added, aluminate dissolved with the ultrafiltration membrane was separated and cleaned to obtain an aqueous dispersion liquid of silica-based particles (P-5-1) with solid-phase concentration of 20 wt %. [Step (c)]

Next, mixed liquid of 150 grams of water dispersion liquid of the silica-based particles (P-5-1), 500 grams of pure water, 1750 grams of ethanol, and 626 grains of ammonia water with concentration of 28 wt % was heated to 35° C. Then, 140 grams of ethyl silicate (SiO$_2$ concentration: 28 wt %) was added to form a silica-coating layer, and was cleaned with an ultrafiltration membrane, while 5 L of pure water was added, to obtain an aqueous dispersion liquid of silica-based particles (P-5-1) having a silica-coating layer with solid content of 20 wt %. [Step (d)]

Next, ammonia water was added to the aqueous dispersion liquid of silica-based particles (P-5-1) having the silica-coating layer to adjust the pH of the dispersion liquid to be 10.5. Then, the dispersion liquid was aged at 150° C. for 11 hours, and was cooled to the room temperature. Then, the dispersion liquid was ion-exchanged for 3 hours using 400 grams of cation exchange resin (Mitsubishi Kagaku K.K.: Diaion SK1B), and ion-exchanged for 3 hours using 200 g of anion exchange resin (Mitsubishi Kagaku K.K.: Diaion SA20A), and ion-exchanged at 80° C. for 3 hours using 200 g of cation exchange resin (Mitsubishi Kagaku K.K.: Diaion SK1B), to obtain an aqueous dispersion liquid of silica-based particles (P-5-2) of solid content of 20 wt %. At that time, Na$_2$O and NH$_3$ content per silica-based particle in the aqueous dispersion liquid of silica-based particles (P-5-2) were 6 ppm and 1100 ppm respectively. [Step (e)]

Next, again, the dispersion liquid of silica-based particles (P-5-2) was processed hydrothermally at 150° C. for 11 hours and cooled to the room temperature. The dispersion liquid was ion-exchanged for 3 hours using 400 grains of cation exchange resin (Mitsubishi Kagaku K.K.: Diaion SK1B), and ion-exchanged for 3 hours using 200 g of anion exchange resin (Mitsubishi Kagaku K.K.: Diaion SA20A), and ion-exchanged at 80° C. for 3 hours using 200 g of cation exchange resin (Mitsubishi Kagaku K.K.: Diaion SK1B) to obtain an aqueous dispersion liquid of silica-based particles (P-5-3) of solid content of 20 wt %. At that time, Na₂O and NH₃ content per silica-based particle in the dispersion liquid of silica-based particles (P-5-3) were 0.5 ppm and 600 ppm respectively. [Step (g)]

Next, an alcohol dispersion liquid of silica-based particles (P-5) with solid content of 20 wt % was prepared, after ethanol was substituted for the solvent using an ultrafiltration membrane.

Preparing a Substrate with a Transparent Coating Film (A-5)

A substrate with a transparent coating film (A-5) was prepared in the same method as described in example 1 except that the alcohol dispersion liquid of the silica-based particles (P-5) was substituted for the alcohol dispersion liquid of the silica-based particles (P-1).

Example 6

Preparation of Silica-Based Particles (P-6)

In example 5, the dispersion liquid of silica-based particles (P-5-2) was cleaned with an ultrafiltration membrane while 5 L of pure water was added, without being processed hydrothermally at 150° C. for 11 hours, to obtain an aqueous dispersion liquid of silica-based particles (P-6-3) with solid content of 20 wt %. At that time, Na₂O and NH₃ content per silica-based particle in the dispersion liquid of silica-based particles (P-6-3) were 0.8 ppm and 1200 ppm respectively.

Next, an alcohol dispersion liquid of silica-based particles (P-6) with solid content of 20 wt % was prepared, after ethanol was substituted for the solvent using an ultrafiltration membrane.

Preparing a Substrate with a Transparent Coating Film (A-6)

A substrate with a transparent coating film (A-6) was prepared in the same method as described in example 1 except that the alcohol dispersion liquid of the silica-based particles (P-6) was substituted for the alcohol dispersion liquid of the silica-based particles (P-1).

Example 7

Preparation of Silica-Based Particles (P-7)

In the same method in example 5, the dispersion liquid of primary particles was prepared, and 6600 grams of aqueous solution of sodium sulfate with concentration of 0.5 wt % (molar ratio: 1.0) was added, and then 6670 grams of aqueous solution of sodium silicate with concentration of 1.5 wt % when calculated as that of SiO₂ and 1050 grams of aqueous solution of sodium aluminate with concentration of 0.5 wt % when calculated as Al₂O₃ were added to obtain a dispersion liquid of composite oxide particles (7) (secondary particles) (average diameter: 50 nm). The MO$_X$/SiO₂ molar ratio (B) then was 0.03, and the pH of the reaction liquid was 11.2. [Step (a), (b)]

Next, 1125 grams of pure water and 100 grams of sodium sulfate with concentration of 0.5 wt % (molar ratio: 0.004) were added to 500 grams of dispersion liquid of the composite oxide particles (7) with solid-phase concentration of 13 wt % after cleaned with an ultrafiltration membrane. Drops of concentrated hydrochloric acid (concentration: 35.5 wt %) were added so as to set the pH to 1.0 to be dealuminated. Next, while 10 L of hydrochloric acid solution with pH3 and 5 L of pure water were added, aluminate dissolved with the ultrafiltration membrane was separated and cleaned to obtain an aqueous dispersion liquid of silica-based particles (P-7-1) with solid-phase concentration of 20 wt %. [Step (c)]

Next, mixed liquid of 150 grams of water dispersion liquid of the silica-based particles (P-7-1), 500 grams of pure water, 1750 grams of ethanol, and 626 grams of ammonia water with concentration of 28 wt % was heated to 35° C. Then, 140 grams of ethyl silicate (SiO₂ concentration: 28 wt %) was added to form a silica-coating layer, and was cleaned with an ultrafiltration membrane, while 5 L of pure water was added, to obtain an aqueous dispersion liquid of silica-based particles (P-7-1) having a silica-coating layer with solid content of 20 wt %. [Step (d)]

Next, ammonia water was added to the aqueous dispersion liquid of silica-based particles (P-7-1) having the silica-coating layer to adjust the pH of the dispersion liquid to be 10.5. Then, the dispersion liquid was aged at 150° C. for 11 hours, and was cooled to the room temperature. Then, the dispersion liquid was ion-exchanged for 3 hours using 400 grams of cation exchange resin (Mitsubishi Kagaku K.K.: Diaion SK1B), and ion-exchanged for 3 hours using 200 g of anion exchange resin (Mitsubishi Kagaku K.K.: Diaion SA20A), and ion-exchanged at 80° C. for 3 hours using 200 g of cation exchange resin (Mitsubishi Kagaku K.K.: Diaion SK1B), to obtain an aqueous dispersion liquid of silica-based particles (P-7-2) of solid content of 20 wt %. At that time, Na₂O and NH₃ content per silica-based particle in the aqueous dispersion liquid of silica-based particles (P-7-2) were 8 ppm and 1200 ppm respectively. [Step (e)]

Next, again, the dispersion liquid of silica-based particles (P-7-2) was processed hydrothermally at 150° C. for 11 hours and cooled to the room temperature. The dispersion liquid was ion-exchanged for 3 hours using 400 grams of cation exchange resin (Mitsubishi Kagaku K.K.: Diaion SK1B), and ion-exchanged for 3 hours using 200 g of anion exchange resin (Mitsubishi Kagaku K.K.: Diaion SA20A), and ion-exchanged at 80° C. for 3 hours using 200 g of cation exchange resin (Mitsubishi Kagaku K.K.: Diaion SK1B) to obtain an aqueous dispersion liquid of silica-based particles (P-7-3) of solid content of 20 wt %. At that time, Na₂O and NH₃ content per silica-based particle in the dispersion liquid of silica-based particles (P-7-3) were 0.9 ppm and 700 ppm respectively. [Step (g)]

Next, an alcohol dispersion liquid of silica-based particles (P-7) with solid content of 20 wt % was prepared, after ethanol was substituted for the solvent using an ultrafiltration membrane.

Preparing a Substrate with a Transparent Coating Film (A-7)

A substrate with a transparent coating film (A-7) was prepared in the same method as described in example 1 except that the alcohol dispersion liquid of the silica-based particles (P-7) was substituted for the alcohol dispersion liquid of the silica-based particles (P-1).

Example 8

Preparation of Silica-Based Particles (P-8)

In the same method in example 5, the aqueous dispersion liquid of silica-based particles (P-5-1) with solid-phase concentration of 20 wt %. [Step (c)]

Next, ammonia water was added to the aqueous dispersion liquid of silica-based particles (P-5-1) to adjust the pH of the dispersion liquid to be 10.5. The dispersion liquid was aged at 150° C. for 11 hours, without forming silica coating layer, and was cooled to the room temperature. Then, the dispersion liquid was ion-exchanged for 3 hours using 400 grains of cation exchange resin (Mitsubishi Kagaku K.K.: Diaion SK1B), and ion-exchanged for 3 hours using 200 g of anion exchange resin (Mitsubishi Kagaku K.K.: Diaion SA20A), and ion-exchanged at 80° C. for 3 hours using 200 g of cation exchange resin (Mitsubishi Kagaku K.K.: Diaion SK1B), to obtain an aqueous dispersion liquid of silica-based particles (P-8-2) of solid content of 20 wt %. At that time, $Na_2O$ and $NH_3$ content per silica-based particle in the aqueous dispersion liquid of silica-based particles (P-8-2) were 10 ppm and 1400 ppm respectively. [Step (e)]

Next, again, the dispersion liquid of silica-based particles (P-8-2) was processed hydrothermally at 150° C. for 11 hours and cooled to the room temperature. The dispersion liquid was ion-exchanged for 3 hours using 400 grams of cation exchange resin (Mitsubishi Kagaku K.K.: Diaion SK1B), and ion-exchanged for 3 hours using 200 g of anion exchange resin (Mitsubishi Kagaku K.K.: Diaion SA20A), and ion-exchanged at 80° C. for 3 hours using 200 g of cation exchange resin (Mitsubishi Kagaku K.K.: Diaion SK1B) to obtain an aqueous dispersion liquid of silica-based particles (P-8-3) of solid content of 20 wt %. At that time, $Na_2O$ and $NH_3$ content per silica-based particle in the dispersion liquid of silica-based particles (P-8-3) were 1.0 ppm and 700 ppm respectively. [Step (g)]

Next, an alcohol dispersion liquid of silica-based particles (P-8) with solid content of 20 wt % was prepared, after ethanol was substituted for the solvent using an ultrafiltration membrane.

Preparing a Substrate with a Transparent Coating Film (A-8)

A substrate with a transparent coating film (A-8) was prepared in the same method as described in example 1 except that the alcohol dispersion liquid of the silica-based particles (P-8) was substituted for the alcohol dispersion liquid of the silica-based particles (P-1).

Example 9

Preparation of Silica-Based Particles (P-9)

In the same method in example 2, the dispersion liquid of $SiO_2.Al_2O_3$ primary particles (average diameter: 35 nm) with 20 wt % solid content was prepared. [Step (a)]

Next, 6600 grams of aqueous solution of sodium sulfate with concentration of 0.5 wt % (molar ratio: 1.0) was added, and 33,000 grains of aqueous solution of sodium silicate with concentration of 1.5 wt % when calculated as that of $SiO_2$ and 11,000 grams of aqueous solution of sodium aluminate with concentration of 0.5 wt % when calculated as $Al_2O_3$ were added to obtain a dispersion liquid of composite oxide particles (9) (secondary particles) (average diameter: 78 nm). The $MO_x/SiO_2$ molar ratio (B) then was 0.07, and the pH of the reaction liquid was 11.0. [Step (b)]

Next, 1125 grains of pure water was added to 500 grams of dispersion liquid of the composite oxide particles (9) with solid-phase concentration of 13 wt % after cleaned with an ultrafiltration membrane. Drops of concentrated hydrochloric acid (concentration: 35.5 wt %) were added so as to set the pH to 1.0 to be dealuminated. Next, while 10 L of hydrochloric acid solution with pH3 and 5 L of pure water were added, aluminate dissolved with the ultrafiltration membrane was separated and cleaned to obtain an aqueous dispersion liquid of silica-based particles (P-9-1) with solid-phase concentration of 20 wt %. [Step (c)]

Next, mixed liquid of 150 grams of water dispersion liquid of the silica-based particles (P-9-1), 500 grains of pure water, 1750 grains of ethanol, and 626 grains of ammonia water with concentration of 28 wt % was heated to 35° C. Then, 80 grains of ethyl silicate ($SiO_2$ concentration: 28 wt %) was added to form a silica-coating layer, and was cleaned with an ultrafiltration membrane, while 5 L of pure water was added, to obtain an aqueous dispersion liquid of silica-based particles (P-9-1) having a silica-coating layer with solid content of 20 wt %. [Step (d)]

Next, ammonia water was added to the aqueous dispersion liquid of silica-based particles (P-9-1) having the silica-coating layer to adjust the pH of the dispersion liquid to be 10.5. Then, the dispersion liquid was aged at 150° C. for 11 hours, and was cooled to the room temperature. Then, the dispersion liquid was ion-exchanged for 3 hours using 400 grams of cation exchange resin (Mitsubishi Kagaku K.K.: Diaion SK1B), and ion-exchanged for 3 hours using 200 g of anion exchange resin (Mitsubishi Kagaku K.K.: Diaion SA20A), and ion-exchanged at 80° C. for 3 hours using 200 g of cation exchange resin (Mitsubishi Kagaku K.K.: Diaion SK1B), to obtain an aqueous dispersion liquid of silica-based particles (P-9-2) of solid content of 20 wt %. At that time, $Na_2O$ and $NH_3$ content per silica-based particle in the aqueous dispersion liquid of silica-based particles (P-9-2) were 2 ppm and 1500 ppm respectively. [Step (e)]

Next, again, the dispersion liquid of silica-based particles (P-9-2) was processed hydrothermally at 150° C. for 11 hours and cooled to the room temperature. The dispersion liquid was ion-exchanged for 3 hours using 400 grams of cation exchange resin (Mitsubishi Kagaku K.K.: Diaion SK1B), and ion-exchanged for 3 hours using 200 g of anion exchange resin (Mitsubishi Kagaku K.K.: Diaion SA20A), and ion-exchanged at 80° C. for 3 hours using 200 g of cation exchange resin (Mitsubishi Kagaku K.K.: Diaion SK1B) to obtain an aqueous dispersion liquid of silica-based particles (P-9-3) of solid content of 20 wt %. At that time, $Na_2O$ and $NH_3$ content per silica-based particle in the dispersion liquid of silica-based particles (P-9-3) were 0.9 ppm and 800 ppm respectively. [Step (g)]

Next, an alcohol dispersion liquid of silica-based particles (P-9) with solid content of 20 wt % was prepared, after ethanol was substituted for the solvent using an ultrafiltration membrane.

Preparing a Substrate with a Transparent Coating Film (A-9)

A substrate with a transparent coating film (A-9) was prepared in the same method as described in example 1 except that the alcohol dispersion liquid of the silica-based particles (P-9) was substituted for the alcohol dispersion liquid of the silica-based particles (P-1).

Example 10

Preparation of Silica-Based Particles (P-10)

In the same method in example 2, the dispersion liquid of $SiO_2.Al_2O_3$ primary particles (average diameter: 35 nm) with 20 wt % solid content was prepared. [Step (a)]

Next, 6600 grams of aqueous solution of sodium sulfate with concentration of 0.5 wt % (molar ratio: 1.0) was added, and 600 grams of aqueous solution of sodium silicate with concentration of 1.5 wt % when calculated as that of $SiO_2$ and 200 grams of aqueous solution of sodium aluminate with concentration of 0.5 wt % when calculated as $Al_2O_3$ were added to obtain a dispersion liquid of composite oxide particles (10) (secondary particles) (average diameter: 37 nm). The $MO_x/SiO_2$ molar ratio (B) then was 0.07, and the pH of the reaction liquid was 11.1. [Step (b)]

Next, 1125 grains of pure water was added to 500 grams of dispersion liquid of the composite oxide particles (10) with solid-phase concentration of 13 wt % after cleaned with an ultrafiltration membrane. Drops of concentrated hydrochloric acid (concentration: 35.5 wt %) were added so as to set the pH to 1.0 to be dealuminated. Next, while 10 L of hydrochloric acid solution with pH3 and 5 L of pure water were added, aluminate dissolved with the ultrafiltration membrane was separated and cleaned to obtain an aqueous dispersion liquid of silica-based particles (P-10-1) with solid-phase concentration of 20 wt %. [Step (c)]

Next, mixed liquid of 150 grams of water dispersion liquid of the silica-based particles (P-10-1), 500 grams of pure water, 1750 grams of ethanol, and 626 grams of ammonia water with concentration of 28 wt % was heated to 35° C. Then, 208 grams of ethyl silicate ($SiO_2$ concentration: 28 wt %) was added to form a silica-coating layer, and was cleaned with an ultrafiltration membrane, while 5 L of pure water was added, to obtain an aqueous dispersion liquid of silica-based particles (P-10-1) having a silica-coating layer with solid content of 20 wt %. [Step (d)]

Next, ammonia water was added to the aqueous dispersion liquid of silica-based particles (P-10-1) having the silica-coating layer to adjust the pH of the dispersion liquid to be 10.5. Then, the dispersion liquid was aged at 150° C. for 11 hours, and was cooled to the room temperature. Then, the dispersion liquid was ion-exchanged for 3 hours using 400 grams of cation exchange resin (Mitsubishi Kagaku K.K.: Diaion SK1B), and ion-exchanged for 3 hours using 200 g of anion exchange resin (Mitsubishi Kagaku K.K.: Diaion SA20A), and ion-exchanged at 80° C. for 3 hours using 200 g of cation exchange resin (Mitsubishi Kagaku K.K.: Diaion SK1B), to obtain an aqueous dispersion liquid of silica-based particles (P-10-2) of solid content of 20 wt %. At that time, $Na_2O$ and $NH_3$ content per silica-based particle in the aqueous dispersion liquid of silica-based particles (P-10-2) were 8 ppm and 1000 ppm respectively. [Step (e)]

Next, again, the dispersion liquid of silica-based particles (P-10-2) was processed hydrothermally at 150° C. for 11 hours and cooled to the room temperature. The dispersion liquid was ion-exchanged for 3 hours using 400 grams of cation exchange resin (Mitsubishi Kagaku K.K.: Diaion SK1B), and ion-exchanged for 3 hours using 200 g of anion exchange resin (Mitsubishi Kagaku K.K.: Diaion SA20A), and ion-exchanged at 80° C. for 3 hours using 200 g of cation exchange resin (Mitsubishi Kagaku K.K.: Diaion SK1B) to obtain an aqueous dispersion liquid of silica-based particles (P-10-3) of solid content of 20 wt %. At that time, $Na_2O$ and $NH_3$ content per silica-based particle in the dispersion liquid of silica-based particles (P-10-3) were 0.8 ppm and 700 ppm respectively. [Step (g)]

Next, an alcohol dispersion liquid of silica-based particles (P-10) with solid content of 20 wt % was prepared, after ethanol was substituted for the solvent using an ultrafiltration membrane.

Preparing a Substrate with a Transparent Coating Film (A-10)

A substrate with a transparent coating film (A-10) was prepared in the same method as described in example 1 except that the alcohol dispersion liquid of the silica-based particles (P-10) was substituted for the alcohol dispersion liquid of the silica-based particles (P-1).

Example 11

Preparation of Silica-Based Particles (P11)

A mixture of 100 grams of silica sol having an average diameter of 5 nm and 3900 grams of pure water were heated to 98° C. In this procedure, pH of mother liquid was 10.5. While this temperature was kept, 7000 grams of aqueous solution of sodium silicate with concentration of 1.5 wt % when calculated as that of $SiO_2$ and 7000 grams of aqueous solution of sodium aluminate with concentration of 0.5 wt % when calculated as that of $Al_2O_3$ were added to obtain a dispersion liquid of $SiO_2.Al_2O_3$ primary particles (average diameter: 10 nm) The $MO_x/SiO_2$ molar ratio (A) then was 0.2, and the pH of the reaction liquid was 12.0. [Step (a)]

Next, 16,740 grams of aqueous solution of sodium silicate with concentration of 1.5 wt % when calculated as that of $SiO_2$ and 5,580 grams of aqueous solution of sodium aluminate with concentration of 0.5 wt % when calculated as $Al_2O_3$ were added to obtain a dispersion liquid of composite oxide particles (11) (secondary particles) (average diameter: 14 nm) The $MO_x/SiO_2$ molar ratio (B) then was 0.07, and the pH of the reaction liquid was 12.0. [Step (b)]

Next, 1125 grams of pure water was added to 500 grams of dispersion liquid of the composite oxide particles (11) with solid-phase concentration of 13 wt % after cleaned with an ultrafiltration membrane. Drops of concentrated hydrochloric acid (concentration: 35.5 wt %) were added so as to set the pH to 1.0 to be dealuminated. Next, while 10 L of hydrochloric acid solution with pH3 and 5 L of pure water were added, aluminate dissolved with the ultrafiltration membrane was separated and cleaned to obtain an aqueous dispersion liquid of silica-based particles (P-11-1) with solid-phase concentration of 20 wt %. [Step (c)]

Next, ammonia water was added to the aqueous dispersion liquid of silica-based particles (P-11-1) to adjust the pH of the dispersion liquid to be 10.5. Then, the dispersion liquid was aged at 150° C. for 11 hours, and was cooled to the room temperature. Then, the dispersion liquid was ion-exchanged for 3 hours using 400 grams of cation exchange resin (Mitsubishi Kagaku K.K.: Diaion SK1B), and ion-exchanged for 3 hours using 200 g of anion exchange resin (Mitsubishi Kagaku K.K.: Diaion SA20A), and ion-exchanged at 80° C. for 3 hours using 200 g of cation exchange resin (Mitsubishi Kagaku K.K.: Diaion SK1B), to obtain an aqueous dispersion liquid of silica-based particles (P-11-2) of solid content of 20 wt %. At that time, $Na_2O$ and $NH_3$ content per silica-based particle in the aqueous dispersion liquid of silica-based particles (P-11-2) were 8 ppm and 1000 ppm respectively. [Step (e)]

Next, again, the dispersion liquid of silica-based particles (P-11-2) was processed hydrothermally at 150° C. for 11 hours and cooled to the room temperature. The dispersion liquid was ion-exchanged for 3 hours using 400 grams of cation exchange resin (Mitsubishi Kagaku K.K.: Diaion SK1B), and ion-exchanged for 3 hours using 200 g of anion exchange resin (Mitsubishi Kagaku K.K.: Diaion SA20A), and ion-exchanged at 80° C. for 3 hours using 200 g of cation exchange resin (Mitsubishi Kagaku K.K.: Diaion SK1B) to obtain an aqueous dispersion liquid of silica-based particles (P-11-3) of solid content of 20 wt %. At that time, $Na_2O$ and $NH_3$ content per silica-based particle in the dispersion liquid of silica-based particles (P-11-3) were 0.9 ppm and 1000 ppm respectively. [Step (g)]

Next, an alcohol dispersion liquid of silica-based particles (P-11) with solid content of 20 wt % was prepared, after ethanol was substituted for the solvent using an ultrafiltration membrane.

Preparing a Substrate with a Transparent Coating Film (A-11)

A substrate with a transparent coating film (A-11) was prepared in the same method as described in example 1 except that the alcohol dispersion liquid of the silica-based particles (P-11) was substituted for the alcohol dispersion liquid of the silica-based particles (P-1).

Example 12

Preparation of Silica-Based Particles (P-12)

The alcoholic dispersion liquid of silica-based particles (P-8) having 20 wt % of solid phase concentration was prepared by using the same procedure to Example 8. [Step (g)]

An alcoholic dispersion liquid of silica-based particles (P-12) having 20 wt % of solid phase concentration and substituted solvent to ethanol was prepared by adding 15 g of acrylsilane coupling agent (KBM-5103: produced by Shin-Etsu Chemical Co., Ltd.) to 100 g of the alcoholic dispersion liquid of silica-based particles (P-8), and heating at 50° C. and using again ultrafiltration membrane. [Step (h)] Preparing a Substrate with a Transparent Coating Film (A-12)

A substrate with a transparent coating film (A-12) was prepared in the same method as described in example 1 except that the alcohol dispersion liquid of the silica-based particles (P-12) was substituted for the alcohol dispersion liquid of the silica-based particles (P-1).

Comparative Example 1

Preparation of Silica-Based Particles (RP-1)

A mixture of 100 grams of silica-alumina sol (USBB-120, produced by Catalysts & Chemicals Industries Co., Ltd., average diameter: 25 nm, concentration of $SiO_2.Al_2O_3$: 20 wt %, $Al_2O_3$ content: 27 wt % in solid phase) and 3900 grams of pure water was heated to 98° C. While this temperature was kept, 1750 grams of aqueous solution of sodium silicate with concentration of 1.5 wt % when calculated as that of $SiO_2$ and 1750 grams of aqueous solution of sodium aluminate with concentration of 0.5 wt % when calculated as that of $Al_2O_3$ were added to obtain a dispersion liquid of $SiO_2.Al_2O_3$ primary particles (average diameter: 35 nm). The $MO_X/SiO_2$ molar ratio (A) then was 0.2, and the pH of the reaction liquid was 12.0.

Next, 5270 grams of aqueous solution of sodium silicate with concentration of 1.5 wt % when calculated as that of $SiO_2$ and 5270 grams of aqueous solution of sodium aluminate with concentration of 0.5 wt % when calculated as $Al_2O_3$ were added to obtain a dispersion liquid of composite oxide particles (R1) (secondary particles) (average diameter: 50 nm) The $MO_X/SiO_2$ molar ratio (B) then was 0.2, and the pH of the reaction liquid was 12.0.

Next, 1125 grams of pure water was added to 500 grams of dispersion liquid of the composite oxide particles (R1) with solid-phase concentration of 13 wt % after cleaned with an ultrafiltration membrane. Drops of concentrated hydrochloric acid (concentration: 35.5 wt %) were added so as to set the pH to 1.0 to be dealuminated. Next, while 10 L of hydrochloric acid solution with pH3 and 5 L of pure water were added, aluminate dissolved with the ultrafiltration membrane was separated and cleaned to obtain an aqueous dispersion liquid of silica-based particles (RP-1) with solid-phase concentration of 20 wt %. At that time, $Na_2O$ and $NH_3$ content per silica-based particle in the aqueous dispersion liquid of silica-based particles (RP-1) were 1000 ppm and less than 10 ppm respectively.

When the average diameter of the silica-based particles (RP-1) was measured, it was approximately 5 nm. And when the silica-based particles (RP-1) were observed by taking transmission electron microscope (TEM), fine particles hardly have void. No substrate having transparent coating film was manufactured.

Comparative Example 2

Preparation of Silica-Based Particles (RP-2)

A mixture of 100 grams of silica-alumina sol (USBB-120, produced by Catalysts & Chemicals Industries Co., Ltd., average diameter: 25 nm, concentration of $SiO_2.Al_2O_3$: 20 wt %, $Al_2O_3$ content: 27 wt % in solid phase) and 3900 grams of pure water was heated to 98° C. While this temperature was kept, 2215 grams of aqueous solution of sodium silicate with concentration of 1.5 wt % when calculated as that of $SiO_2$ and 350 grams of aqueous solution of sodium aluminate with concentration of 0.5 wt % when calculated as that of $Al_2O_3$ were added to obtain a dispersion liquid of $SiO_2.Al_2O_3$ primary particles (average diameter: 35 nm) The $MO_X/SiO_2$ molar ratio (A) then was 0.03, and the pH of the reaction liquid was 12.0.

Next, 6670 grams of aqueous solution of sodium silicate with concentration of 1.5 wt % when calculated as that of $SiO_2$ and 1055 grams of aqueous solution of sodium aluminate with concentration of 0.5 wt % when calculated as $Al_2O_3$ were added to obtain a dispersion liquid of composite oxide particles (RP2) (secondary particles) (average diameter: 50 nm) The $MO_X/SiO_2$ molar ratio (B) then was 0.03, and the pH of the reaction liquid was 12.0.

Next, 1125 grams of pure water was added to 500 grams of dispersion liquid of the composite oxide particles (RP2) with solid-phase concentration of 13 wt % after cleaned with an ultrafiltration membrane. Drops of concentrated hydrochloric acid (concentration: 35.5 wt %) were added so as to set the pH to 1.0 to be dealuminated. Next, while 10 L of hydrochloric acid solution with pH3 and 5 L of pure water were added, aluminate dissolved with the ultrafiltration membrane was separated and cleaned to obtain an aqueous dispersion liquid of silica-based particles (RP-2-1) with solid-phase concentration of 20 wt %.

Next, ammonia water was added to the aqueous dispersion liquid of silica-based particles (RP-2-1) to adjust the pH of the dispersion liquid to be 10.5. Then, the dispersion liquid was aged at 150° C. for 11 hours, and was cooled to the room temperature. Then, the dispersion liquid was ion-exchanged for 3 hours using 400 grams of cation exchange resin (Mitsubishi Kagaku K.K.: Diaion SK1B), and ion-exchanged for 3 hours using 200 g of anion exchange resin (Mitsubishi Kagaku K.K.: Diaion SA20A), and ion-exchanged at 80° C. for 3 hours using 200 g of cation exchange resin (Mitsubishi Kagaku K.K.: Diaion SK1B), to obtain an aqueous dispersion liquid of silica-based particles (RP-2-2) of solid content of 20 wt %. At that time, $Na_2O$ and $NH_3$ content per silica-based particle in the aqueous dispersion liquid of silica-based particles (RP-2-2) were 6 ppm and 1500 ppm respectively.

Next, again, the dispersion liquid of silica-based particles (RP-2-2) was processed hydrothermally at 150° C. for 11 hours and cooled to the room temperature. The dispersion liquid was ion-exchanged for 3 hours using 400 grams of cation exchange resin (Mitsubishi Kagaku K.K.: Diaion SK1B), and ion-exchanged for 3 hours using 200 g of anion exchange resin (Mitsubishi Kagaku K.K.: Diaion SA20A), and ion-exchanged at 80° C. for 3 hours using 200 g of cation exchange resin (Mitsubishi Kagaku K.K.: Diaion SK1B) to obtain an aqueous dispersion liquid of silica-based particles (RP-2-3) of solid content of 20 wt %. At that time, $Na_2O$ and $NH_3$ content per silica-based particle in the dispersion liquid of silica-based particles (RP-2-3) were 0.5 ppm and 900 ppm respectively.

Next, an alcohol dispersion liquid of silica-based particles (RP-2) with solid content of 20 wt % was prepared, after ethanol was substituted for the solvent using an ultrafiltration membrane.

Preparing a Substrate with a Transparent Coating Film (RA-2)

A substrate with a transparent coating film (RA-2) was prepared in the same method as described in example 1 except that the alcohol dispersion liquid of the silica-based particles (RP-2) was substituted for the alcohol dispersion liquid of the silica-based particles (P-1).

Comparative Example 3

Preparation of Silica-Based Particles (RP-3)

A mixture of 100 grams of silica-alumina sol (USBB-120, produced by Catalysts & Chemicals Industries Co., Ltd., average diameter: 25 nm, concentration of $SiO_2$—$Al_2O_3$: 20 wt %, $Al_2O_3$ content: 27 wt % in solid phase) and 3900 grams of pure water was heated to 98° C. While this temperature was kept, 2310 grams of aqueous solution of sodium silicate with concentration of 1.5 wt % when calculated as that of $SiO_2$ and 60 grains of aqueous solution of sodium aluminate with concentration of 0.5 wt % when calculated as that of $Al_2O_3$ were added to obtain a dispersion liquid of $SiO_2.Al_2O_3$ primary particles (average diameter: 35 nm) The $MO_X/SiO_2$ molar ratio (A) then was 0.005, and the pH of the reaction liquid was 12.0.

Next, 6980 grams of aqueous solution of sodium silicate with concentration of 1.5 wt % when calculated as that of $SiO_2$ and 135 grams of aqueous solution of sodium aluminate with concentration of 0.5 wt % when calculated as $Al_2O_3$ were added to obtain a dispersion liquid of composite oxide particles (RP3) (secondary particles) (average diameter: 50 nm) The $MO_X/SiO_2$ molar ratio (B) then was 0.0038, and the pH of the reaction liquid was 12.0.

Next, 1125 grams of pure water was added to 500 grams of dispersion liquid of the composite oxide particles (RP3) with solid-phase concentration of 13 wt % after cleaned with an ultrafiltration membrane. Drops of concentrated hydrochloric acid (concentration: 35.5 wt %) were added so as to set the pH to 1.0 to be dealuminated. Next, while 10 L of hydrochloric acid solution with pH3 and 5 L of pure water were added, aluminate dissolved with the ultrafiltration membrane was separated and cleaned to obtain an aqueous dispersion liquid of silica-based particles (RP-3-1) with solid-phase concentration of 20 wt %.

Next, ammonia water was added to the aqueous dispersion liquid of silica-based particles (RP-3-1) to adjust the pH of the dispersion liquid to be 10.5. Then, the dispersion liquid was aged at 150° C. for 11 hours, and was cooled to the room temperature. Then, the dispersion liquid was ion-exchanged for 3 hours using 400 grams of cation exchange resin (Mitsubishi Kagaku K.K.: Diaion SK1B), and ion-exchanged for 3 hours using 200 g of anion exchange resin (Mitsubishi Kagaku K.K.: Diaion SA20A), and ion-exchanged at 80° C. for 3 hours using 200 g of cation exchange resin (Mitsubishi Kagaku K.K.: Diaion SK1B), to obtain an aqueous dispersion liquid of silica-based particles (RP-3-2) of solid content of 20 wt %. At that time, $Na_2O$ and $NH_3$ content per silica-based particle in the aqueous dispersion liquid of silica-based particles (RP-3-2) were 12 ppm and 1000 ppm respectively.

Next, again, the dispersion liquid of silica-based particles (RP-3-2) was processed hydrothermally at 150° C. for 11 hours and cooled to the room temperature. The dispersion liquid was ion-exchanged for 3 hours using 400 grains of cation exchange resin (Mitsubishi Kagaku K.K.: Diaion SK1B), and ion-exchanged for 3 hours using 200 g of anion exchange resin (Mitsubishi Kagaku K.K.: Diaion SA20A), and ion-exchanged at 80° C. for 3 hours using 200 g of cation exchange resin (Mitsubishi Kagaku K.K.: Diaion SK1B) to obtain an aqueous dispersion liquid of silica-based particles (RP-3-3) of solid content of 20 wt %. At that time, $Na_2O$ and $NH_3$ content per silica-based particle in the dispersion liquid of silica-based particles (RP-3-3) were 1 ppm and 800 ppm respectively.

Next, an alcohol dispersion liquid of silica-based particles (RP-3) with solid content of 20 wt % was prepared, after ethanol was substituted for the solvent using an ultrafiltration membrane.

Preparing a Substrate with a Transparent Coating Film (RA-3)

A substrate with a transparent coating film (RA-3) was prepared in the same method as described in example 1 except that the alcohol dispersion liquid of the silica-based particles (RP-3) was substituted for the alcohol dispersion liquid of the silica-based particles (P-1).

Comparative Example 4

Preparation of Silica-Based Particles (RP-4-1)

A mixture of 100 grams of silica-alumina sol (USBB-120, produced by Catalysts & Chemicals Industries Co., Ltd., average diameter: 25 nm, concentration of $SiO_2.Al_2O_3$: 20 wt %, $Al_2O_3$ content: 27 wt % in solid phase) and 3900 grams of pure water was heated to 98° C. While this temperature was kept, 245 grams of aqueous solution of sodium silicate with concentration of 1.5 wt % when calculated as that of $SiO_2$ and 6250 grams of aqueous solution of sodium aluminate with concentration of 0.5 wt % when calculated as that of $Al_2O_3$ were added to obtain a dispersion liquid of $SiO_2.Al_2O_3$ primary particles (average diameter: 35 nm) The $MO_X/SiO_2$ molar ratio (A) then was 5, and the pH of the reaction liquid was 12.0.

Next, 740 grams of aqueous solution of sodium silicate with concentration of 1.5 wt % when calculated as that of $SiO_2$ and 18,860 grams of aqueous solution of sodium aluminate with concentration of 0.5 wt % when calculated as $Al_2O_3$ were added to obtain a dispersion liquid of composite oxide particles (RP4) (secondary particles) (average diameter: 50 nm). The $MO_X/SiO_2$ molar ratio (B) then was 5, and the pH of the reaction liquid was 12.0.

Next, 1125 grams of pure water was added to 500 grams of dispersion liquid of the composite oxide particles (RP4) with solid-phase concentration of 13 wt % after cleaned with an ultrafiltration membrane. Drops of concentrated hydrochloric acid (concentration: 35.5 wt %) were added so as to set the pH to 1.0 to be dealuminated. Next, while 10 L of hydrochloric acid solution with pH3 and 5 L of pure water were added, aluminate dissolved with the ultrafiltration membrane was separated and cleaned to obtain an aqueous dispersion liquid of silica-based particles (R-4-1) with solid-phase concentration of 20 wt %. At that time, $Na_2O$ and $NH_3$ content per silica-based particle in the aqueous dispersion liquid of silica-based particles (RP-4-1) were 1200 ppm and less than 10 ppm respectively.

When the average diameter of the silica-based particles (RP-4-1) was measured, it was approximately 5 nm And when the silica-based particles (RP-1) were observed by taking transmission electron microscope (TEM), fine particles hardly have void. No substrate having transparent coating film was manufactured.

Comparative Example 5

Preparation of Silica-Based Particles (RP-5)

In the same method in example 1, the aqueous dispersion liquid of silica-based particles (P-1-1) with solid-phase concentration of 20 wt %.

Next, the dispersion liquid was ion-exchanged for 3 hours using 400 grams of cation exchange resin (Mitsubishi Kagaku K.K.: Diaion SK1B), and ion-exchanged for 3 hours using 200 g of anion exchange resin (Mitsubishi Kagaku K.K.: Diaion SA20A), and ion-exchanged at 80° C. for 3 hours using 200 g of cation exchange resin (Mitsubishi Kagaku K.K.: Diaion SK1B), to obtain an aqueous dispersion liquid of silica-based particles (RP-5-2) of solid content of 20 wt %. At that time, $Na_2O$ and $NH_3$ content per silica-based particle in the aqueous dispersion liquid of silica-based particles (RP-5-2) were 8 ppm and 1300 ppm respectively.

Next, an alcohol dispersion liquid of silica-based particles (RP-5) with solid content of 20 wt % was prepared, after ethanol was substituted for the solvent using an ultrafiltration membrane.

Preparing a Substrate with a Transparent Coating Film (RA-5)

A substrate with a transparent coating film (RA-5) was prepared in the same method as described in example 1 except that the alcohol dispersion liquid of the silica-based particles (RP-5) was substituted for the alcohol dispersion liquid of the silica-based particles (P-1).

Comparative Example 6

Preparation of Silica-Based Particles (RP-6)

In the same method in example 1, the aqueous dispersion liquid of silica-based particles (P-1-1) having a silica-coating layer with solid content of 20 wt %.

Next, the dispersion liquid was ion-exchanged for 3 hours using 400 grams of cation exchange resin (Mitsubishi Kagaku K.K.: Diaion SK1B), and ion-exchanged for 3 hours using 200 g of anion exchange resin (Mitsubishi Kagaku K.K.: Diaion SA20A), and ion-exchanged at 80° C. for 3 hours using 200 g of cation exchange resin (Mitsubishi Kagaku K.K.: Diaion SK1B), to obtain an aqueous dispersion liquid of silica-based particles (RP-6-2) of solid content of 20 wt %. At that time, $Na_2O$ and $NH_3$ content per silica-based particle in the aqueous dispersion liquid of silica-based particles (RP-6-2) were 9 ppm and 1400 ppm respectively.

Next, an alcohol dispersion liquid of silica-based particles (RP-6) with solid content of 20 wt % was prepared, after ethanol was substituted for the solvent using an ultrafiltration membrane.

Preparing a Substrate with a Transparent Coating Film (RA-6)

A substrate with a transparent coating film (RA-6) was prepared in the same method as described in example 1 except that the alcohol dispersion liquid of the silica-based particles (RP-6) was substituted for the alcohol dispersion liquid of the silica-based particles (P-1).

Comparative Example 7

Preparation of Silica-Based Particles (RP-7)

An alcoholic dispersion liquid of silica particles (RP-7) having solid content concentration of 20 wt % was prepared by substituting ethyl alcohol with an ultrafiltration membrane for the solvent of silica sol (SI-45P, produced by Catalysts & Chemicals Industries Co., Ltd., average diameter: 45 nm, refractive index: 1.43, concentration of $SiO_2$: 40 wt %).

Preparing a Substrate with a Transparent Coating Film (RA-7)

A substrate with a transparent coating film (RA-7) was prepared in the same method as described in example 1 except that the alcohol dispersion liquid of the silica-based particles (RP-7) was substituted for the alcohol dispersion liquid of the silica-based particles (P-1).

TABLE 1

| | Preparation of silica-based fine particles | | | | | | | | | |
|---|---|---|---|---|---|---|---|---|---|---|
| | Primary Particle | | Secondary Particle | | | | | | | |
| | Molar Ratio (A) | Average diameter (Dp1) nm | Molar Ratio (B) | Average diameter (Dp2)nm | Electrolyte (ME/MS) | Ratio (B/A) | Ratio (Dp1/Dp2) | Step (C) Electrolyte (ME/MS) | Aging | Hydro Thermal Process |
| Example 1 | 0.2 | 28 | 0.07 | 40 | — | 0.35 | 0.7 | — | Yes | Yes |
| Example 2 | 0.2 | 35 | 0.07 | 50 | — | 0.35 | 0.7 | — | Yes | Yes |
| Example 3 | 0.2 | 120 | 0.07 | 171 | — | 0.35 | 0.7 | — | Yes | Yes |
| Example 4 | 0.2 | 35 | 0.15 | 50 | 0.5 | 0.75 | 0.7 | 0.004 | Yes | Yes |
| Example 5 | 0.2 | 35 | 0.07 | 50 | 1.0 | 0.35 | 0.7 | 0.004 | Yes | Yes |
| Example 6 | 0.2 | 35 | 0.07 | 50 | 1.0 | 0.35 | 0.7 | 0.004 | Yes | No |
| Example 7 | 0.2 | 35 | 0.03 | 50 | 1.0 | 0.15 | 0.7 | 0.004 | Yes | Yes |
| Example 8 | 0.2 | 35 | 0.07 | 50 | 1.0 | 0.35 | 0.7 | Yes | Yes | Yes |
| Example 9 | 0.2 | 35 | 0.07 | 78 | 1.0 | 0.35 | 0.45 | — | Yes | Yes |
| Example 10 | 0.2 | 35 | 0.07 | 37 | 1.0 | 0.35 | 0.96 | — | Yes | Yes |
| Example 11 | 0.2 | 10 | 0.07 | 14 | — | 0.35 | 0.7 | — | Yes | Yes |
| Example 12 | 0.2 | 35 | 0.07 | 50 | 1.0 | 0.35 | 0.7 | Yes | Yes | No |
| Comp.Ex.1 | 0.2 | 35 | 0.2 | 50 | — | 1 | 0.7 | No | No | No |
| Comp.Ex.2 | 0.03 | 35 | 0.03 | 50 | — | 1 | 0.7 | No | Yes | Yes |
| Comp.Ex.3 | 0.005 | 35 | 0.0038 | 50 | — | 0.75 | 0.7 | No | Yes | Yes |
| Comp.Ex.4 | 5 | 35 | 5 | 50 | — | 1 | 0.7 | No | No | No |
| Comp.Ex.5 | 0.2 | 28 | 0.07 | 40 | — | 0.35 | 0.7 | No | No | No |

TABLE 1-continued

Preparation of silica-based fine particles

| | Primary Particle | | Secondary Particle | | | | | | | |
|---|---|---|---|---|---|---|---|---|---|---|
| | Molar Ratio (A) | Average diameter (Dp1) nm | Molar Ratio (B) | Average diameter (Dp2)nm | Electrolyte (ME/MS) | Ratio (B/A) | Ratio (Dp1/Dp2) | Step (C) Electrolyte (ME/MS) | Aging | Hydro Thermal Process |
| Comp.Ex.6 | 0.2 | 28 | 0.07 | 40 | — | 0.35 | 0.7 | No | No | No |
| Comp.Ex.7 | — | — | — | 45 | — | — | — | — | — | No |

TABLE 2

Silica-based fine particles

| | Molar Ratio (A) | Average diameter nm | $S_B$ m²/g | $S_C$ m²/g | $S_B/S_C$ | Thickness of Outer Shell | Refractive Index | Na₂O ppm | NH₃ ppm | Water Resistance |
|---|---|---|---|---|---|---|---|---|---|---|
| Example 1 | 0.0017 | 56 | 125 | 48.7 | 2.6 | 10 | 1.32 | 0.5 | 800 | ○ |
| Example 2 | 0.0018 | 66 | 115 | 41.3 | 2.8 | 10 | 128 | 0.4 | 600 | ◎ |
| Example 3 | 0.0018 | 187 | 45 | 14.6 | 3.1 | 10 | 1.30 | 0.4 | 600 | ○ |
| Example 4 | 0.0019 | 66 | 118 | 41.3 | 2.9 | 10 | 1.26 | 0.3 | 700 | ○ |
| Example 5 | 0.0015 | 66 | 111 | 41.3 | 2.7 | 10 | 1.32 | 0.5 | 600 | ○ |
| Example 6 | 0.0017 | 66 | 120 | 41.3 | 2.9 | 10 | 1.29 | 0.8 | 1200 | ○ |
| Example 7 | 0.0013 | 55 | 128 | 49.6 | 2.6 | 10 | 1.31 | 0.9 | 700 | ○ |
| Example 8 | 0.0018 | 50 | 98 | 54.5 | 1.8 | 10 | 1.34 | 1.0 | 700 | ○ |
| Example 9 | 0.0019 | 94 | 86 | 29.0 | 3.0 | 10 | 1.18 | 0.8 | 800 | ○ |
| Example 10 | 0.0017 | 53 | 129 | 51.5 | 2.5 | 10 | 1.33 | 0.8 | 700 | ○ |
| Example 11 | 0.0020 | 14 | 580 | 194.8 | 3.0 | 10 | 1.38 | 0.9 | 1000 | ○ |
| Example 12 | 0.0018 | 60 | 69 | 45.5 | 1.5 | 11 | 1.32 | 0.8 | 800 | ○ |
| Comp.Ex.1 | 0.0017 | 5(collapse) | — | 545.5 | — | — | — | 1000 | <10 | — |
| Comp.Ex.2 | 0.0009 | 50 | 75 | 54.5 | 1.4 | — | 1.41 | 0.5 | 900 | ○ |
| Comp.Ex.3 | 0.0006 | 50 | 73 | 54.5 | 1.3 | — | 1.42 | 0.5 | 800 | ○ |
| Comp.Ex.4 | 0.002 | 5(collapse) | — | 545.5 | — | — | — | 1200 | <10 | — |
| Comp.Ex.5 | 0.0015 | 50 | 780 | 54.5 | 14.3 | 8 | 1.39 | 8 | 1300 | X |
| Comp.Ex.6 | 0.0020 | 66 | 214 | 41.3 | 5.2 | 10 | 1.39 | 9 | 1400 | X |
| Comp.Ex.7 | — | 45 | 63 | 60.6 | 1.04 | — | 1.43 | 4000 | <10 | ◎ |

TABLE 3

Substrate with Transparent Coating Film

| | Total Transmittance % | Haze % | Reflectance % | Refractive Index | Adhesiveness | Pencil Hardness |
|---|---|---|---|---|---|---|
| Example 1 | 96.3 | 0.3 | 0.6 | 1.36 | ◎ | 4H |
| Example 2 | 96.5 | 0.2 | 0.4 | 1.31 | ◎ | 3H |
| Example 3 | 96.1 | 0.3 | 0.5 | 1.32 | ◎ | 3H |
| Example 4 | 96.5 | 0.2 | 0.5 | 1.31 | ◎ | 3H |
| Example 5 | 96.3 | 0.2 | 0.6 | 1.35 | ◎ | 3H |
| Example 6 | 96.2 | 0.3 | 0.5 | 1.32 | ○ | H |
| Example 7 | 96.4 | 0.2 | 0.5 | 1.31 | ◎ | 3H |
| Example 8 | 96.1 | 0.3 | 0.5 | 1.31 | ◎ | 3H |
| Example 9 | 96.3 | 0.3 | 0.3 | 1.39 | ◎ | 3H |
| Example 10 | 96.1 | 0.3 | 0.6 | 1.30 | ◎ | 3H |
| Example 11 | 96.1 | 0.3 | 0.8 | 1.38 | ◎ | 3H |
| Example 12 | 96.2 | 0.2 | 0.6 | 1.31 | ◎ | 3H |
| Comp.Ex.1 | — | — | — | — | — | — |
| Comp.Ex.2 | 96.3 | 0.3 | 1.5 | 1.45 | ◎ | 3H |
| Comp.Ex.3 | 96.1 | 0.3 | 1.7 | 1.45 | ◎ | 3H |
| Comp.Ex.4 | — | — | — | — | — | — |
| Comp.Ex.5 | 96.2 | 0.3 | 1.5 | 1.45 | ○ | 3H |
| Comp.Ex.6 | 96.3 | 0.3 | 1.5 | 1.45 | ○ | 3H |
| Comp.Ex.7 | 96.3 | 0.3 | 2.0 | 1.45 | ◎ | 3H |

The invention claimed is:

1. A method of producing hollow spherical silica-based particles, comprising:
   (a) a step of preparing a first dispersion liquid of first composite oxide particles having an average diameter ($D_{p1}$) of 3 to 300 nm by simultaneously adding a solution (M) containing element M and a solution (S) into an alkali aqueous solution so that a molar ratio ($MO_x/SiO_2$) of the first dispersion liquid is 0.01 to 2, wherein the solution (M) is an aqueous solution of an alkali soluble inorganic compound, the element M is at least one of Al, B, Ti, Zr, Sn, Ce, P, Sb, Mo, Zn, and W, the solution (S) is at least one of an aqueous silicate solution and an acidic silicic acid solution, the $MO_x$ denotes a molar number of the element M contained in the solution (M) in terms of an oxide, and the $SiO_2$ denotes a molar number of an element Si contained in the solution (S) in terms of an oxide ($SiO_2$), (b-1) a step of preparing a second dispersion liquid by adding an electrolytic salt into the first dispersion liquid so that a molar ratio ($M_E/M_S$) of the second dispersion liquid is 0.1 to 10, (b-2) a step of preparing a third dispersion liquid of third composite oxide particles that are the first composite oxide particles forming shells around the first composite oxide particles by adding a solution (M) containing element M and a solution (S) into the second dispersion liquid so that a value of B/A (the A denotes the molar ratio ($MOx/SiO_2$) of the first dispersion liquid, the B denotes the molar ratio ($MOx/SiO_2$) of the third dispersion liquid) satisfies $0<(B/A)\leq 0.8$, wherein the electrolytic salt is a water-soluble compound selected from the group consisting of sodium chloride, potassium chloride, sodium nitrate, potassium nitrate, ammonium sulfate, magnesium chloride, and magnesium nitrate, the $M_E$ denotes a number of mole of the electrolytic salt, the $M_S$ denotes a number of mole of the element Si contained in the first dispersion liquid in terms of the oxide ($SiO_2$), the solution (M) of the step (b-2) is an aqueous solution of an alkali soluble inorganic compound, the element M is at least one of Al, B, Ti, Zr, Sn, Ce, P, Sb, Mo, Zn, and W, the solution (S) of the step (b-2) is at least one of an aqueous silicate solution and an acidic silicic acid solution, the $MO_x$ denotes a molar number of the element M contained in the solution (M) of the step (b-2) in terms of an oxide, and the $SiO_2$ denotes a molar number of an element Si contained in the solution (S) of the step (b-2) in terms of an oxide ($SiO_2$), (c-1) a step of adding an acid into the third dispersion liquid to dissolve elements constituting the third composite oxide particles other than silicon, (c-2) a step of removing dissolved elements from a fourth dispersion liquid obtained by the step (c-1), and (e) a step of aging a fifth dispersion liquid obtained by the step (c-2) at a room temperature to 300° C., wherein the third composite oxide particles have an average diameter ($Dp_2$) of up to 500 nm, and a relationship between the $Dp_1$ and the $Dp_2$ is $3 \leq Dp_1 < Dp_2 \leq 500$ nm.

2. The method of producing hollow spherical silica-based particles according to claim 1, wherein a ratio ($D_{p1}/D_{p2}$) of the average diameter ($D_{p1}$) of the first composite oxide particles versus the average diameter ($D_{p2}$) of the third composite oxide particles is 0.4 to 0.98.

3. The method of producing hollow spherical silica-based particles according to claim 1, further comprising a step (d) performed between the step (c-2) and the step (e):

(d) a step of adding at least one of an organic silicon compound expressed by the following chemical formula (1) and a partially hydrolyzed product thereof into the fifth dispersion liquid obtained by the step (c-2) to form a silica-coating layer on fifth composite oxide particles included in the fifth dispersion liquid:

$$R_nSiX_{(4-n)} \qquad (1)$$

wherein R denotes a not-substituted or substituted hydrocarbon group having 1 to 10 carbon atoms, an acrylic group, an epoxy group, a methacrylic group, amino group, mercapto group, or a $CF_3$ group; X denotes an alkoxy group having 1 to 4 carbon atoms, a hydroxy group, a halogen or hydrogen; and n indicates an integral number of 0 to 3.

4. The method of producing hollow spherical silica-based particles according to claim 1, further comprising a step (f):

(f) a step of adding at least one of an organic silicon compound expressed by the following chemical formula (1) and a partially hydrolyzed product thereof into a sixth dispersion liquid obtained by the step (e) to form a silica-coating layer on sixth composite oxide particles included in the sixth dispersion liquid:

$$R_nSiX_{(4-n)} \qquad (1)$$

wherein R denotes a not-substituted or substituted hydrocarbon group having 1 to 10 carbon atoms, an acrylic group, an epoxy group, a methacrylic group, amino group, mercapto group, or a $CF_3$ group; X denotes an alkoxy group having 1 to 4 carbon atoms, a hydroxy group, a halogen or hydrogen; and n indicates an integral number of 0 to 3.

5. The method of producing hollow spherical silica-based particles according to claim 4, further comprising a step (g-2) after the step (f):

(g-2) a step of hydrothermal processing at 50 to 300° C. after cleaning an eighth dispersion liquid obtained by the step (f).

6. The method of producing hollow spherical silica-based particles according to claim 5, further comprising a step (h-2) after the step (g-2):

(h-2) a step of adding at least one of an organic silicon compound expressed by the following chemical formula (1) and a partially hydrolyzed product thereof into a ninth dispersion liquid obtained by the step (g-2) to form a silica-coating layer on ninth composite oxide particles included in the ninth dispersion liquid:

$$R_nSiX_{(4-n)} \qquad (1)$$

wherein R denotes a not-substituted or substituted hydrocarbon group having 1 to 10 carbon atoms, an acrylic group, an epoxy group, a methacrylic group, amino group, mercapto group, or a $CF_3$ group; X denotes an alkoxy group having 1 to 4 carbon atoms, a hydroxy group, a halogen or hydrogen; and n indicates an integral number of 0 to 3.

7. The method of producing hollow spherical silica-based particles according to claim 1, wherein pH of the alkali aqueous solution is 10 or more.

8. The method of producing hollow spherical silica-based particles according to claim 1, further comprising a step (g-1) after the step (e):

(g-1) a step of hydrothermal processing at 50 to 300° C. after cleaning a sixth dispersion liquid obtained by the step (e).

9. The method of producing hollow spherical silica-based particles according to claim 8, further comprising a step (h-1) after the step (g-1):

(h-1) a step of adding at least one of an organic silicon compound expressed by the following chemical formula (1) and a partially hydrolyzed product thereof into a seventh dispersion liquid obtained by the step (g-1) to form a silica-coating layer on seventh composite oxide particles included in the seventh dispersion liquid:

$$R_n SiX_{(4-n)} \tag{1}$$

wherein R denotes a not-substituted or substituted hydrocarbon group having 1 to 10 carbon atoms, an acrylic group, an epoxy group, a methacrylic group, amino group, mercapto group, or a $CF_3$ group; X denotes an alkoxy group having 1 to 4 carbon atoms, a hydroxy group, a halogen or hydrogen; and n indicates an integral number of 0 to 3.

10. The method of producing hollow spherical silica-based particles according to claim 1, further comprising:
a step of cleaning, drying, and calcining.

11. The method of producing hollow spherical silica-based particles according to claim 1, wherein a content of an alkali metal oxide in a sixth dispersion liquid obtained by the step (e) or a content of an alkali metal oxide in sixth composite oxide particles included in the sixth dispersion liquid is 5 ppm or below as expressed by a content of $M_{A2}O$ per the sixth composite oxide particles ($M_A$ denotes an alkali metal element).

12. The method of producing hollow spherical silica-based particles according to claim 1, wherein contents of ammonia and ammonium ions in a sixth dispersion liquid obtained by the step (e) or contents of ammonia and ammonium ions in sixth composite oxide particles included in the sixth dispersion liquid are 1500 ppm or below as expressed by a content of $NH_3$ per the sixth composite oxide particles.

13. The method of producing hollow spherical silica-based particles according to claim 1, wherein the solution (M) is a solution containing a compound selected from the group consisting of sodium aluminate, sodium tetraborate, zirconyl ammonium carbonate, potassium antimonate, potassium stannate, sodium aluminosilicate, sodium molybdate, cerium ammonium nitrate, and sodium phosphate.

14. The method of producing hollow spherical silica-based particles according to claim 1, wherein an electrolytic salt is added into the third dispersion liquid obtained by the step (b-2) so that a molar ratio ($M_E/M_S$) is 0.1 to 10 before the step (c-1),
the electrolytic salt is a water-soluble compound selected from the group consisting of sodium chloride, potassium chloride, sodium nitrate, potassium nitrate, ammonium sulfate, magnesium chloride, and magnesium nitrate,
the $M_E$ denotes a number of mole of the electrolytic salt, and
the $M_S$ denotes a number of mole of the element Si contained in the third dispersion liquid in terms of the oxide ($SiO_2$).

* * * * *